US012656614B2

(12) United States Patent
Stump et al.

(10) Patent No.: US 12,656,614 B2
(45) Date of Patent: Jun. 16, 2026

(54) EYEWEAR DEVICE WITH IMPROVED STABILITY

(71) Applicant: MAGIC LEAP, INC., Plantation, FL (US)

(72) Inventors: Kyle Michael Stump, Plantation, FL (US); Narendra Persaud, Sunrise, FL (US); Brian James Heckman, Plantation, FL (US); Jason Donald Mareno, Raleigh, NC (US)

(73) Assignee: Magic Leap, Inc., Plantation, FL (US)

( * ) Notice: Subject to any disclaimer, the term of this patent is extended or adjusted under 35 U.S.C. 154(b) by 339 days.

(21) Appl. No.: 18/281,375

(22) PCT Filed: Mar. 11, 2022

(86) PCT No.: PCT/US2022/071109
§ 371 (c)(1),
(2) Date: Sep. 11, 2023

(87) PCT Pub. No.: WO2022/192913
PCT Pub. Date: Sep. 15, 2022

(65) Prior Publication Data
US 2024/0151974 A1 May 9, 2024

Related U.S. Application Data

(60) Provisional application No. 63/160,318, filed on Mar. 12, 2021.

(51) Int. Cl.
| | |
|---|---|
| *G02B 27/01* | (2006.01) |
| *G02C 5/14* | (2006.01) |
| *G02C 11/00* | (2006.01) |

(52) U.S. Cl.
CPC ......... *G02B 27/0172* (2013.01); *G02C 5/146* (2013.01); *G02C 11/10* (2013.01)

(58) Field of Classification Search
CPC ............ G02B 27/0172; G02B 27/0176; G02B 30/10; G02C 5/146; G02C 11/10; G02C 3/003
(Continued)

(56) References Cited

U.S. PATENT DOCUMENTS

| | | | | |
|---|---|---|---|---|
| 5,880,773 A | * | 3/1999 | Suzuki | G02B 27/04 348/121 |
| 10,281,728 B2 | * | 5/2019 | Miller | G02B 27/0176 |

(Continued)

FOREIGN PATENT DOCUMENTS

| | | |
|---|---|---|
| CN | 211860502 U | 11/2020 |
| WO | WO 2019/135210 A1 | 7/2019 |

OTHER PUBLICATIONS

PCT International Search Report and Written Opinion Appln. No. PCT/US22/71109, Applicant Magic Leap, Inc., dated May 11, 2022.

*Primary Examiner* — William R Alexander
(74) *Attorney, Agent, or Firm* — Vista IP Law Group, LLP

(57) ABSTRACT

An eyewear device for being worn on a head of a user for presenting virtual content to a user comprises an optics system and a frame front operatively coupled to the optics system for presenting virtual content to a user wearing the eyewear device. The eyewear device further comprises left and right opposing temple arms affixed to the frame front, and a torsion band assembly having opposing ends that connect the left and right opposing temple arms together. The eyewear device further comprises at least a first floating boss that protrudes partially into one of the left and right opposing temple arms, such that the first floating boss(es) moves within the one of the left and right opposing temple arms in one or more axes in a constrained manner.

20 Claims, 17 Drawing Sheets

(58) Field of Classification Search
USPC ........................................................ 359/630
See application file for complete search history.

(56) References Cited

U.S. PATENT DOCUMENTS

| | | | |
|---|---|---|---|
| 10,976,543 B1 * | 4/2021 | Cho ........................ | H04S 7/304 |
| 2016/0054571 A1 * | 2/2016 | Tazbaz .............. | G02B 27/0176 |
| | | | 359/630 |
| 2017/0367423 A1 * | 12/2017 | Reitz ...................... | A42B 1/045 |
| 2018/0055202 A1 * | 3/2018 | Miller ................ | G02B 27/0176 |
| 2018/0295733 A1 | 10/2018 | Wen et al. | |
| 2018/0308385 A1 * | 10/2018 | Sommers ............... | G09B 19/00 |
| 2018/0364491 A1 * | 12/2018 | Park ................... | G02B 27/0176 |
| 2019/0196228 A1 | 6/2019 | Moore et al. | |
| 2019/0361244 A1 * | 11/2019 | Carollo ............. | G02B 27/0176 |
| 2021/0123563 A1 * | 4/2021 | Shanley, IV ....... | G02B 27/0176 |
| 2021/0132395 A1 * | 5/2021 | Doyle ................... | H05K 1/189 |
| 2021/0132889 A1 * | 5/2021 | Sato ................. | G02B 27/0172 |
| 2021/0191147 A1 * | 6/2021 | Thiruppathi .......... | G02C 3/003 |
| 2021/0191148 A1 * | 6/2021 | Tsai ........................ | G02C 5/12 |
| 2021/0349320 A1 * | 11/2021 | Ben Yacov .......... | G02B 6/0076 |
| 2021/0349322 A1 * | 11/2021 | Harris ................ | G02B 27/0176 |
| 2021/0397005 A1 * | 12/2021 | Otsuka ................... | G06T 15/04 |

* cited by examiner

EYEWEAR DEVICE WITH IMPROVED STABILITY

RELATED APPLICATION DATA

This application claims priority to PCT Application No. PCT/US2022/071109, filed on Mar. 11, 2022, which claims priority to U.S. Provisional Application Ser. No. 63/160,318, filed Mar. 12, 2021. The contents of the above-mentioned patent applications are hereby expressly incorporated herein by reference.

TECHNICAL FIELD

This disclosure generally relates to eyewear devices and, more particularly, to improved designs of eyewear devices that include optics and/or electronics with temples (or temple arms) to position and support the eyewear devices, such as spatial computing eyewear devices, extended reality eyewear devices, smart eyewear devices, etc.

BACKGROUND

Eyewear devices having optics and/or electronics (e.g., spatial computing headsets, including virtual reality (VR), augmented reality (AR), mixed reality (MR), and extended reality (XR) headsets or eyewear devices) often provide, in addition to temples, one or more bands or straps behind and/or atop a wearer's head to provide more support for the eyewear devices by distributing the weight of an eyewear device among more support areas for reduced pressure on the wearer and/or to provide better comfort and/or better fit. Conventional bands or straps may be designed around an average head size and/or shape and are often required to expand or contract to accommodate different head sizes and/or shapes.

Some eyewear devices include optics that are much more complex than conventional eyeglasses and are thus heavier, especially towards the frame front of the eyewear devices. For example, some eyewear devices employ an opaque visor having one or more LCD (liquid crystal display) panels as the "lenses" for the eyewear devices to display digital contents. Some eyewear devices even contain the provisioning for mounting a smart phone, so that users may view the contents on the smart phone display through the lenses of these eyewear devices. These eyewear devices often fixedly attach one or more adjustable bands to the eyewear device to distribute the weight of the eyewear devices towards the sides, the top, and/or the rear of a user's head. Some other more advanced eyewear devices, such as augmented reality or extended reality headsets, employ transparent or at least translucent lenses to allow the users to perceive the physical environment around them and may directly project digital contents to the eyes of the user to blend the digital contents with the physical environment, rather than displaying digital contents on a screen that occludes or obstructs the user's view of the physical environment. The aforementioned eyewear devices may add more weight, and may thus need one or more bands or straps to provide better and more comfortable support.

One of the challenges is that eyewear devices may suffer from various instability issues due to deformations or deflection of, for example, the frame or housing of an eyewear device's structure or a portion thereof from manipulations, such as fitting these eyewear devices on users' head of various different sizes and shapes, handling the eyewear devices, etc. Such deformations or deflections may cause an eyewear device having delicate optics to deviate from its intended or as-designed position(s) or even fall outside a permissible range to cause degradation in the quality of the presentations and/or discomfort. For example, eyewear devices usually adopt structures or components made of light-weight materials to avoid exerting too much pressure or load on a user's head or face to cause discomfort. Such light-weight materials may be more susceptible to mechanical bending, torsion, etc., arising from manipulations of the eyewear devices and/or fit of the eyewear devices on users and causing deformations or deflections in the eyewear devices. Such deformations or deflections may not only cause discomfort or fit issues (e.g., slippage of an eyewear device when worn, undesirable pressure distribution on the user, etc.) but may also negatively affect, for example, the relative positioning of the eyewear devices to users' heads, the positioning of optical components (e.g., lenses, projectors, etc.) relative to users' heads and/or eyes, and/or optic characteristics (e.g., virtual focal planes at respective focal depths, etc.) in such a way that the performance and/or user experience of the eyewear devices is hindered.

Some conventional eyewear devices attempt to address the aforementioned challenges caused by deformations or deflections by adopting a flexible head band or strap made of, for example, soft elastic or spongy materials, such as polyurethane (PU) leather, various types of foams, etc. When compared to hard head bands or straps made of, for example, thermoplastic polymer such as Acrylonitrile butadiene styrene (ABS), these soft elastic or spongy materials often do not provide sufficient support or resistance against torsion due to the intrinsic nature of these materials, and are thus considered as inferior to rigid head straps or bands.

Some head bands or straps enforce such soft elastic or spongy materials with rigid thermoplastic structural components to provide better support and some ability against torsion. For example, Facebook's Oculus Quest 2 utilizes thermoplastic structural members that are fixedly attached to both sides of the virtual reality goggles and are positioned around the back of a user's head with an additional fastening tape that is placed atop the user's head. These head bands or straps are, at best, hingedly attached to the eyewear devices to accommodate manipulations in one degree of freedom (e.g., pivoting around the hinge that attaches the strap or band to the side of the eyewear device). Nonetheless, these eyewear devices need to rely on the elastic properties of such rigid structural components to accommodate torsion, in a less desirable manner, arising from manipulations that deviate from the single degree of freedom provided by the hinges (e.g., manipulations exerting torsion in an axis orthogonal or substantially orthogonal to the rotation axis of the hinge).

For eyewear devices that perform optimally when the optics and/or projection systems (e.g., a projector that projects light beams of digital contents to the eyes of a user) are properly aligned with the pupils of a user, these conventional eyewear devices do not provide satisfactory stability as well as performance, especially their lack of ability against deformations or deflections caused by torsion, because such deformations or deflections may cause the optical components to deviate from their ideal or as-designed positions relative to a user's eyes, and thus, reduce the optical performance (e.g., deterioration in focus, vergence, or accommodation, etc. due to the deviations). Therefore, there is a need for an eyewear device with improved stability for eyewear devices to address at least the aforementioned shortcomings, challenges, and problems with conventional eyewear devices.

SUMMARY

In accordance with the present inventions, an eyewear device for being worn on a head of a user for presenting virtual content to a user is provided. The eyewear device comprises an optics system and a frame front operatively coupled to the optics system for presenting virtual content to a user wearing the eyewear device. The eyewear device further comprises left and right opposing temple arms affixed to the frame front, and a torsion band assembly having opposing ends that connect the left and right opposing temple arms together. The eyewear device further comprises at least a first floating boss that protrudes partially into one of the left and right opposing temple arms, such that the first floating boss(es) moves within the one of the left and right opposing temple arms in one or more axes (e.g., at least one axis of the first floating boss(es) and/or an axis orthogonal to the axis(es) of the first floating boss(es)) in a constrained manner. In an optional embodiment, the eyewear device further comprises at least at least a cap or fastener respectively affixed to the first floating boss(es) within the one of the left and right opposing temple arms, thereby retaining at least a portion of the first floating boss(es) within the one of the left and right opposing temple arms.

In one embodiment, the eyewear device further comprises at least a second floating boss that protrudes partially into the other of the left and right opposing temple arms. In this embodiment, the left temple arm may comprise a left temple arm housing into which the first floating boss(es) protrudes, and the right temple arm may comprise a right temple arm housing into which the second floating boss(es) protrudes. The left temple arm housing may have at least one opening (e.g., an elongated opening) through which the first floating boss(es) extends, and the right temple arm housing may have at least one opening (e.g., an elongated opening) through which the second floating boss(es) extends. The eyewear device may further comprise electronics contained within at least one of the left temple arm housing and the right temple arm housing for controlling the optics system.

In another embodiment, the torsion band assembly further comprises a torsion band guide, and a left torsion band housing and a right torsion band housing that jointly enclose, and slide along, the torsion band guide to extend or contract a total length of the torsion band assembly. In this embodiment, the first floating boss(es) may be configured for allowing an increase in a gap between the one of the left and right opposing temple arms and the torsion band assembly when the total length of the torsion band assembly is extended, and for allowing a decrease in the gap between the one of the left and right opposing temple arms and the torsion band assembly when the total length of the torsion band assembly is contracted. The torsion band assembly may further optionally comprise at least one spring located within the torsion band guide, wherein the at least one spring is configured for being compressed or expanded when the total length of the torsion band assembly increases, thereby assisting in securing the torsion band assembly to the head of the user. The first floating boss(es) may be fixedly attached to one of the left torsion band housing and the right torsion band housing. Each of the left torsion band housing and a right torsion band housing may comprise a plurality of cage snaps arranged within the torsion band assembly at one or move spacing values, such that the spacing value(s) change when the total length of the torsion band assembly changes or the torsion band assembly deforms. The earwear device may further comprise a head strap having opposing ends, in which case, the torsion band assembly may further comprise a left eyelet affixed between the left torsion band housing and one of the opposing ends of the head strap, and a right eyelet affixed between the right torsion band housing and the other end of the head strap, such that the head strap is configured for resting on a top of the head of the user to provide support along a direction of gravity.

In still another embodiment, the torsion band assembly further comprises at least one cushion pad located on an inner side of the torsion band assembly that faces the head of the user when wearing the eyewear device, and at least one cosmetic cover located on an outer side of the torsion band assembly that faces away from the head of the user when wearing the eyewear device.

In yet another embodiment, the eyewear device further comprises a fastener affixing the one of the left and right opposing temple arms to the torsion band assembly at an attachment point, thereby preventing the one of the left and right opposing arms from moving relative to the torsion band assembly at the attachment point. The attachment point may be further along the torsion band assembly from the frame front than the first floating boss(es).

Other and further aspects and features of the invention will be evident from reading the following detailed description of the preferred embodiments, which are intended to illustrate, not limit, the invention.

BRIEF DESCRIPTION OF DRAWINGS

The drawings illustrate the design and utility of embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
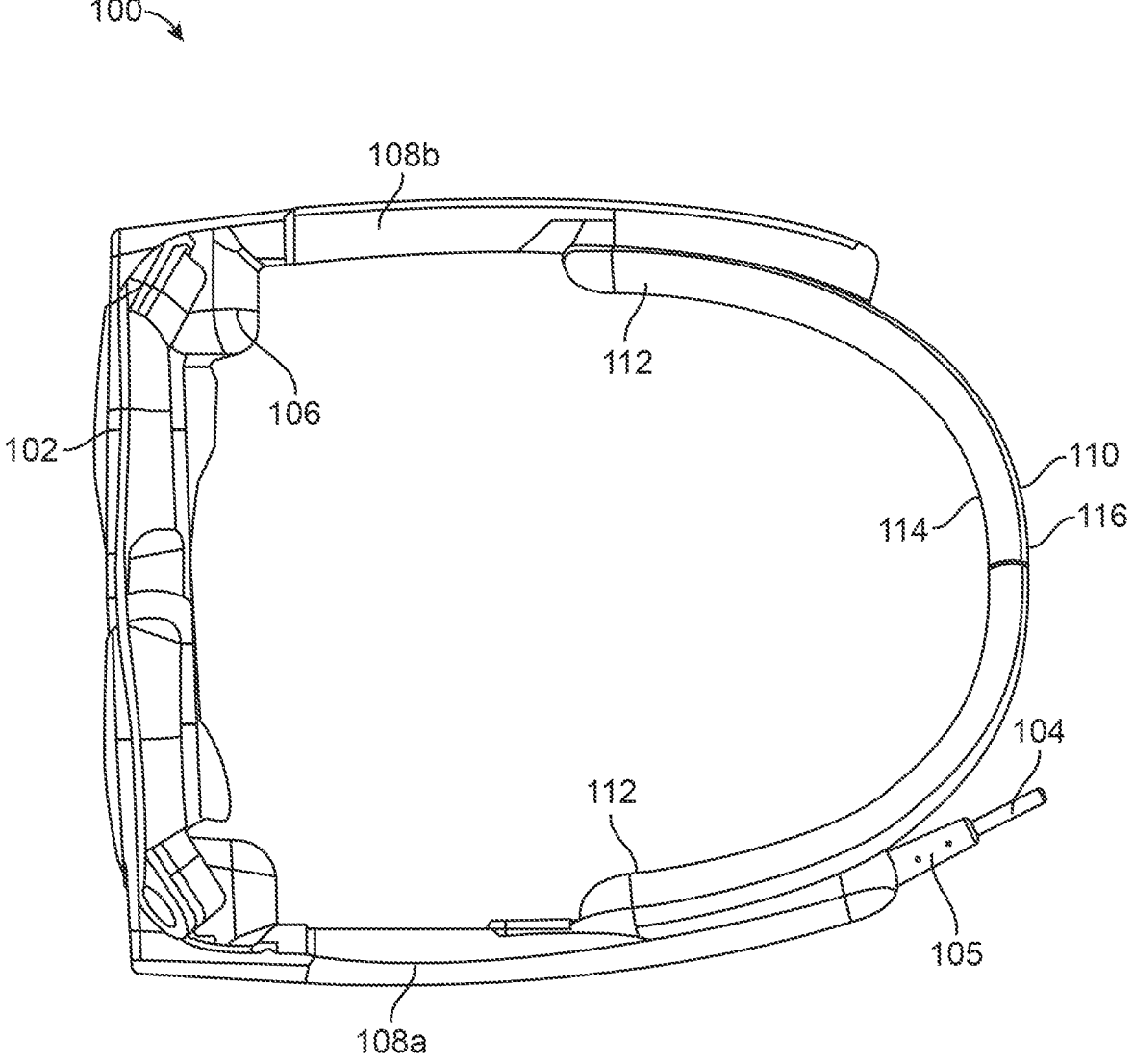
FIG. 1 is a to view of one embodiment of an eyewear device constructed in accordance with the present inventions.

Referring to FIG. 1, an eyewear device 100 with improved stability and enhanced ability against torsion will be described. The eyewear device 100 comprises a frame front or eyewear housing 102 that accommodates an optical system having optical components (e.g., lens, waveguides, diffractive elements, projection fibers, etc.) and/or electronic components (e.g., a right and/or left printed circuit board assembly illustrated in FIG. 15). The frame front 102 may include a provisioning 106 for accommodating the optics components and/or electronic components to project light beams for digital contents with, for example, a bundle of projection fibers into the lenses that, in turn, propagate the light beams through various optical components into the eyes (e.g., pupils) of a user. The electronic components may receive may receive power and transmit signals via a cable 104 and associated electrical connector 105 from, e.g., an external device (e.g., a belt pack worn by a user, a computing device such as a desktop computer, a laptop computer, a smart portable device, etc., or any other portable or stationary computing devices) that supplies, for example, power and compute resources to the eyewear device 100.

The eyewear device 100 further comprises two opposing temple arms 108 (a left temple arm 108a and a right temple arm 108b) affixed to the frame front 102 and a torsion band assembly 110 that connects the opposing temple arms 108 together at opposing ends 112 of the torsion band assembly 110. The torsion band assembly 110 has an inner side 114 that faces toward the head of a user wearing the eyewear device 100, and an outer side 116 that faces away from the head of the user. The torsion band assembly 110 and at least one of the two opposing temple arms 108 are devised in such a way to provide a more comfortable fit to better conform to varying contours or profiles of users' heads, while alleviating the load exerted on or perceived by users when wearing the eyewear device 100. Furthermore, the torsion band assembly 110 and at least one of the two opposing temple arms 108 are devised in such a way to provision better stability as well as the ability to accommodate torsion in multiple degrees-of-freedom due to, for example, the fit and/or manipulations of the eyewear devices by users.

Figure 2:
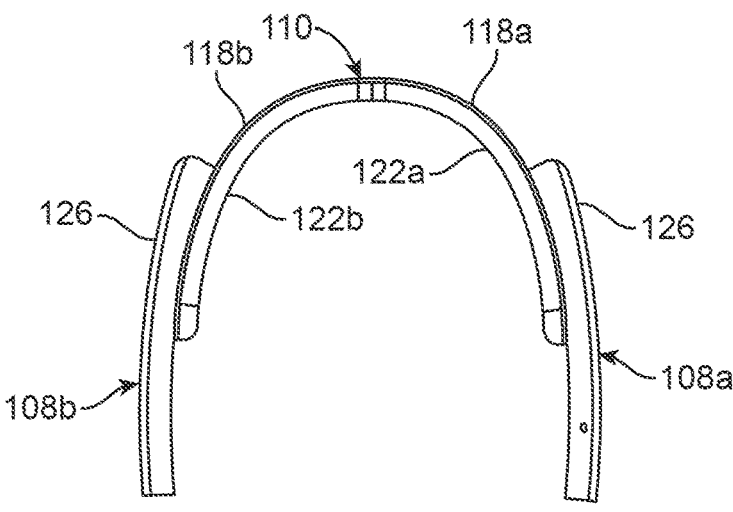
FIG. 2 is a top view of a subassembly of two opposing left and right temple arms and a torsion band assembly of the eyewear device of FIG. 1, particularly showing the torsion band assembly in a contracted configuration.
Figure 3:
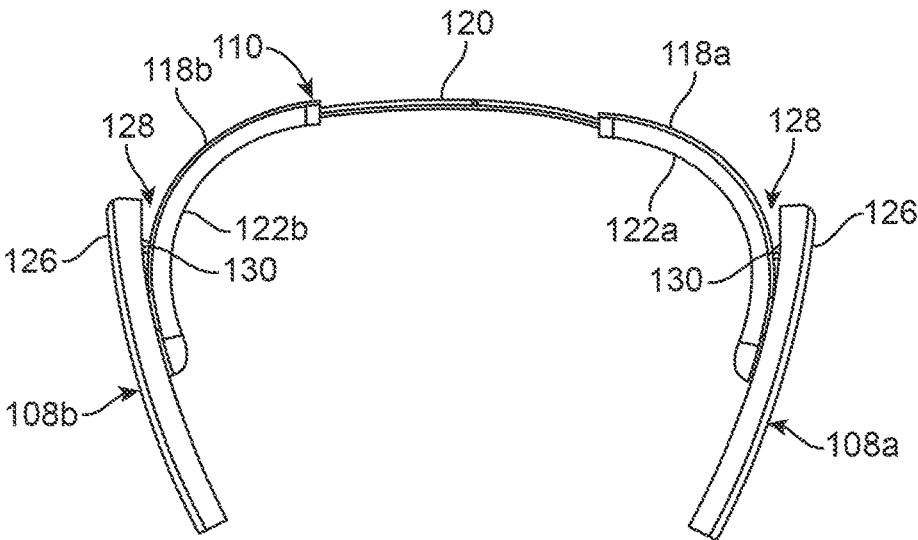
FIG. 3 is a top view of the subassembly of FIG. 2, particularly showing the torsion band assembly in an expanded configuration.
Figure 4:
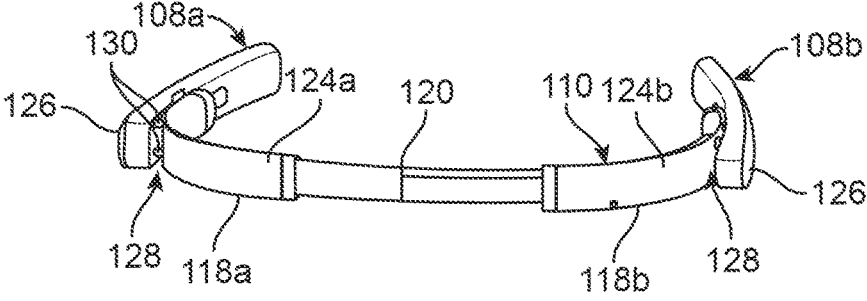
FIG. 4 is a rear perspective view of the subassembly of FIG. 2, particularly showing a torsion guide of the torsion band assembly when in the expanded configuration.

Referring further to FIGS. 2-4, the torsion band assembly 110 may be transitioned between a closed or contracted configuration (FIG. 2) and an open or expanded configuration (FIGS. 3-4). To facilitate transitioning between the closed and open configurations, the torsion band assembly 110 comprises a pair of torsion band housings 118 (a left torsion band housing 118a and a right torsion band housing 118b) and a torsion band guide 120. The torsion band housings 118a, 118b jointly enclose, and directly or indirectly slide along, the torsion band guide 120 to extend or contract a total length of the torsion band assembly 110. Thus, the torsion band housings 118a, 118b may converge together along the torsion band guide 120 to place the torsion band assembly 110 in the closed configuration and diverge from each other along the torsion band guide 120 to place the torsion band assembly 110 in the open configuration. As best illustrated in FIGS. 3-4, when the torsion band assembly 110 is in the open configuration, the torsion band guide 120 is exposed.

The torsion band guide 120 may be made of any materials (e.g., polymers such as homopolymer acetal also known as Delrin, Copolymer acetal, other similar or equivalent materials, etc.) that possess good wear resistance that may be determined based at least in part upon the product life cycle of the eyewear device 100, so that repeated sliding of the torsion band housings 118a, 118b against the sliding rail 608B during the product life cycle may not cause excessive wear on the torsion band guide 120 in such a negative manner to prevent the torsion band guide 120 from performing its intended functions (e.g., providing proper and/or more comfortable fit, providing structural support, properly positioning the eyewear device 100 with respect to the user's head and/or eyes, etc.) In addition to or in the alternative of a choice of a lower friction material, the contact surfaces on the torsion band guide 120 may also be processed to reduce or minimize friction (e.g., a fabrication process such as molding and/or machining to achieve a better surface finish such as a lower surface roughness or Ra) to further reduce wear and to provide smooth operations.

The torsion band assembly 110 further comprises a separable soft, yet supportive, padding or cushion pad to accommodate expanding and contracting of the torsion band assembly 110. In particular, the torsion band assembly 110 comprises a pair of soft, yet supportive, padding or cushion pads 122 (a left cushion pad 122a and a right cushion pad 122b) respectively affixed to the torsion band housings 118a, 118b on the inner side 114 of the torsion band assembly 110. Although, in the illustrated embodiment, the cushion pads 122a, 122b are separate structural members that overlay atop corresponding surfaces of the torsion band housings 118a, 118b, in an alternative embodiment, the cushion pads 122a, 122b may serve as parts of the torsion band housings 118. The cushion pads 122a, 122b may be affixed to the torsion band housings 118a, 118b in many different ways such as, without limitation, adhesives, co-molding the cushion pads 122a, 122b with the torsion band housing 118a, 118b, or any other appropriate fabrication processes.

The cushion pads 122a, 122b deform according to the contour of the head of a user wearing the eyewear device 100 to provide more comfortable, better fit and/or better structural support for weight and positioning of the eyewear device 100, while the rigid torsion band guide 120 provides better structural integrity and strength to more uniformly distribute the weight of the eyewear device 100 with its stronger structural strength to resist bending, torque or torsion, etc. (e.g., flexural strength against bending, shear strength against torque or torsion, tensile strength against deflection, etc.). The cushion pads 122a, 122b may manufactured as integral, yet separable parts, of the torsion band housings 118a, 118b, or may be manufactured as integral and inseparable parts of the torsion band housing 118a, 118b. The cushion pads 122a, 122b may be affixed to the torsion band housings 118a, 118b in many different ways, such as, without limitation, adhesives, co-molding the cushion pads 122a, 122b with the torsion band housings 118a, 118b, or any other appropriate fabrication processes.

As best illustrated in FIG. 4, the torsion band assembly 110 further comprises a cosmetic cover. In particular, the torsion band assembly 110 comprises a pair of cosmetic covers 124 (a left cosmetic cover 124a and a right cosmetic cover 124b) respectively affixed to the torsion band housings 118a, 118b on the outer side 116 of the torsion band assembly 110 to provide a more aesthetically pleasing appearance and/or to provide even better structural integrity and strength. Although, in the illustrated embodiment, the cosmetic covers 124a, 124b are separate structural members that overlay atop corresponding surfaces of the torsion band housings 118a, 118b, in an alternative embodiment, the cosmetic covers 124a, 124b may serve as parts of the torsion band housings 118a, 118b. The cosmetic covers 124a, 124b may be affixed to the torsion band housings 118a, 118b in many different ways such as, without limitation, adhesives, co-molding the cosmetic covers 124a, 124b with the torsion band housing 118a, 118b, or any other appropriate fabrication processes. The cosmetic covers 124a, 124b may be formed of rigid yet elastic materials (e.g., thermoplastic materials, metals, etc.) to provide more structural strength for better support of the weight of the eyewear device 100 and structural strength against bending, torsion, etc.

In the open configuration illustrated in FIGS. 3-4, the temple arms 108 and the torsion band assembly 110 are devised to allow the torsion band assembly 110 to deviate from rear ends 126 of the temple arms 108 (i.e., the ends away from the frame front 102 illustrated in FIG. 1), as shown by wider gaps 128 between the temple arms 106 and the torsion band assembly 110, so that the torsion band assembly 110 better conforms to the contour of a user's head. In contrast, in the closed configuration illustrated in FIG. 2, the gaps 128 shrink or disappear, so that the insides of the temple arms 108 stay closer to or coincide with the outer surfaces of the torsion band housings 118a, 118b. To facilitate expansion and contraction of the gaps 128 between the temple arms 108a, 108b and the torsion band assembly 110, eyewear device 100 further comprises one or more floating bosses 130 (a pair of floating bosses 130 in the embodiment illustrated in FIGS. 3-4). As will be described in further detail below, the floating bosses 130 are affixed to each of the torsion band housings 118a, 118b, and move within the respective temple arms 108a, 108b in one or more axes in a constrained manner.

Figure 7:
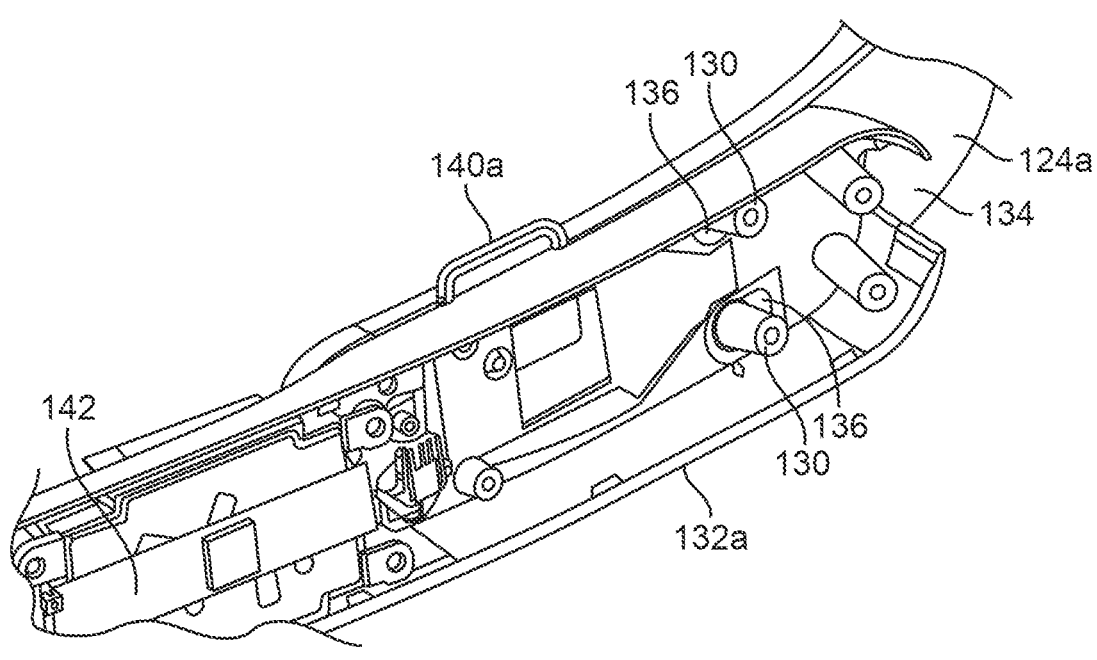
FIG. 7 is a close-up side perspective view of the left temple arm of the subassembly of FIG. 2, particularly showing a portion of a left temple arm housing removed from the left temple arm.
Figure 8:
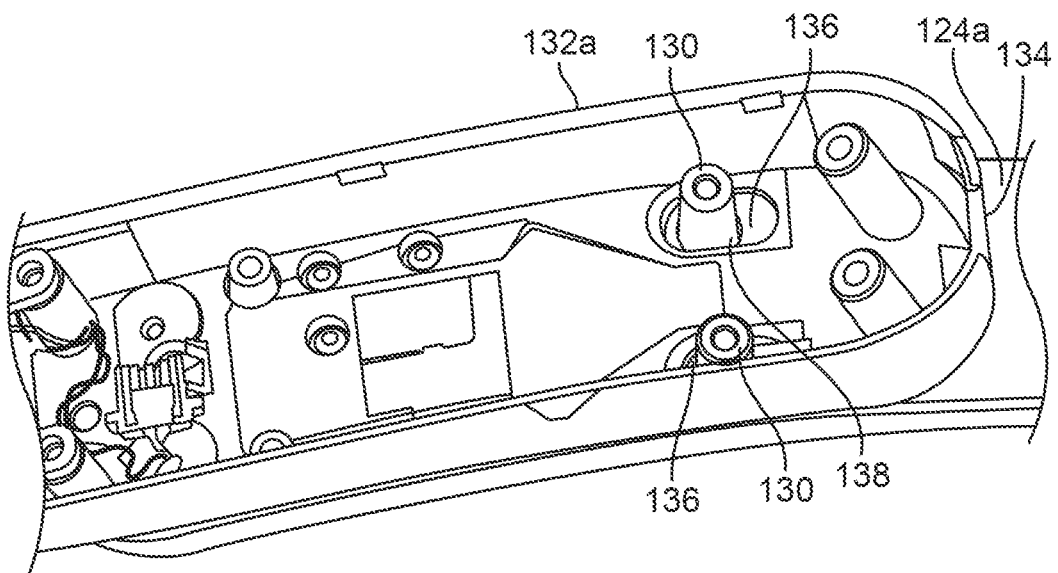
FIG. 8 is a close-up top perspective view of the left temple arm of the subassembly of FIG. 2, particularly showing a portion of a left temple arm housing removed from the left temple arm.
Figure 9:
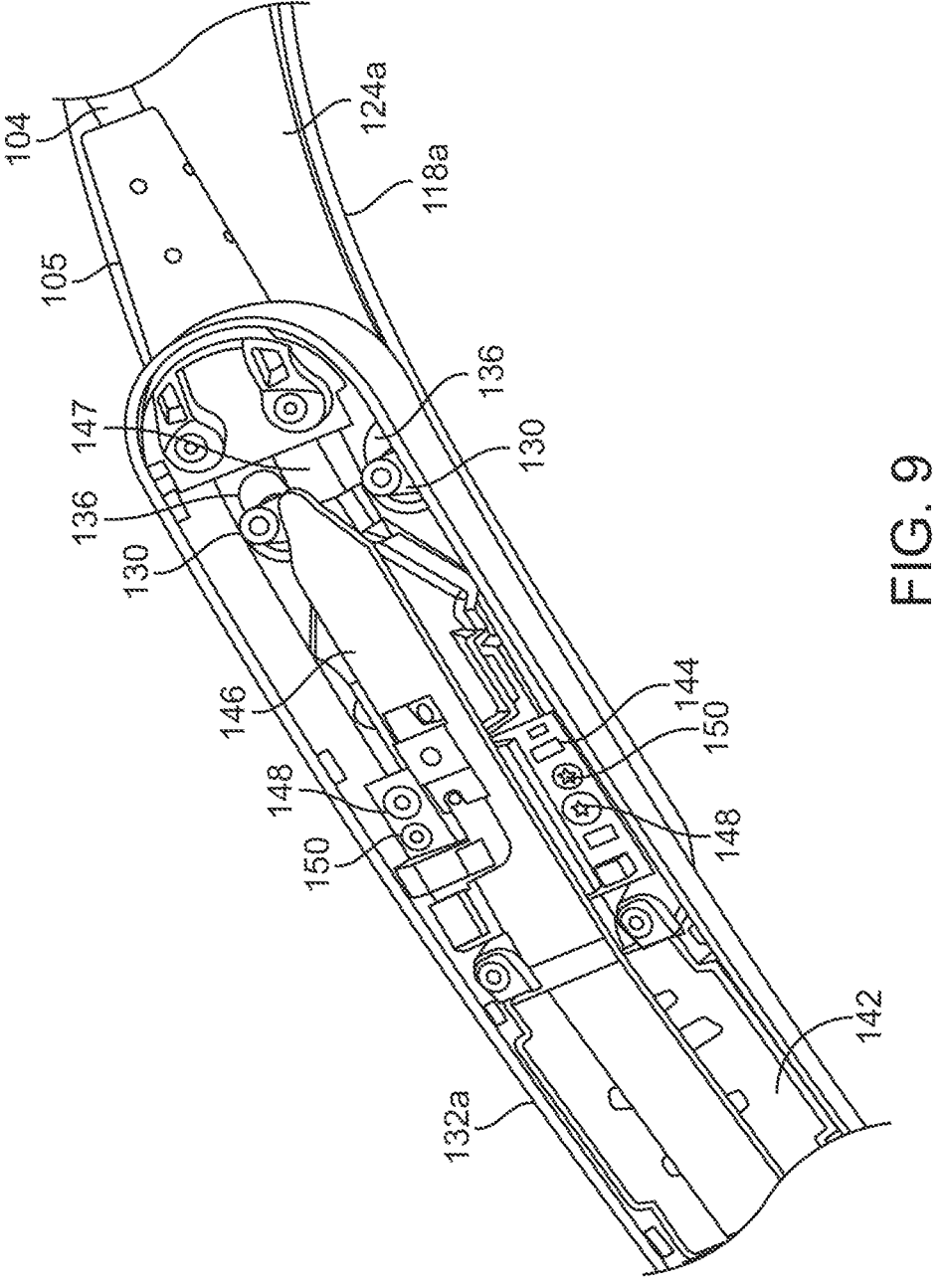
FIG. 9 is a close-up top perspective view of the left temple arm of the subassembly of FIG. 2, particularly showing the electronics the left temple arm.

Referring now to FIGS. 5-9, the temple arms 108a, 108b respectively comprise temple arm housings 132 (and in particular, a left temple arm housing 132a and a right templar arm housing 132b) respectively affixed to the torsion band housings 118a, 118b. One or both of the temple arm housings 132a, 132b may accommodate electronics, as will be described in further detail below. In this case, one or both of the temple arm housings 132a, 132b may include an opening 134 to accommodate the electrical connector 105 and association cable 104 (shown in FIG. 9) for powering up and/or transmitting data to and from the electronics housed therein. It should be noted that, although FIG. 9 illustrates an example configuration where the electrical connector 105 is located at the end of the right temple arm housing 132b, the electrical connector 105 may be located anywhere on the left inner arm housing 132a or even on the frame front 102 in some other embodiments. Moreover, the eyewear device 100 may include only a single connector 105, or may have more than one connector 105 (e.g., one connector provided on the left temple arm housing 132a and another connector provided on the right temple arm housing 132b) in some other embodiments.

It follows that the arrangement of connectors 105 dictate the location and number of openings 134. In the illustrated embodiment, the opening 134 is formed at the end or ends of the temple arm housings 132a, 132b opposite the frame front 102. In the case where only one of the temple arm housings 132a, 132b houses electronics, the opening 134 is provided on the corresponding inner temple arm housing to power up and transmit data to and from the electronics. In the case where both the temple arm housings 132a, 132b house some electronics, both of the temple arm housings 132a, 132b may include openings to accommodate cabling for powering up and/or transmitting data to and from the electronics housed therein. Alternatively, only one of the temple arm housings 132a, 132b may include the opening 134 for accommodating the cable 104 for powering up and transmitting data to and from the electronics in both of the temple arm housings 132a, 132b. In this case, the electronics housed in the inner temple arm housing that is not provided with the opening 134 may be operatively coupled to the cable 104 via internal connections inside the temple arm housings 132a, 132b and/or frame front 102.

As described above, floating bosses 130 protrude into each of the temple arms 108a, 108b. To this end, the temple arms 108a, 108b respectively comprise openings 136 formed in the temple arm housings 132a, 132b (only the openings 136 formed in the left temple arm housing 132a shown) through which the floating bosses 130 extend. The openings 136 allow the floating bosses 130 affixed to each of the torsion band housings 118a, 118b to move in one or more axes in a constrained manner. Although the floating bosses 130 are illustrated as being cylindrical in nature (i.e., having a circular cross-section), the cross-sections of the floating bosses 130 may be, e.g., rectangular, elliptical, square, etc. Likewise, the openings 136 may have any shape, such as circular, rectangular, elliptical, square, elongated hole, etc. through which the floating bosses 130 may move in multiple directions, while constraining the extent of deformations or deflections of the torsion band assembly 110 and/or the frame front 102 of the eyewear device 100 to better accommodate torsion or torque and to provide better stability of the eyewear device 100 than, for example, configurations where the torsion band guide 110 is merely attached to the temple arms 108a, 108b.

The size of the openings 136 may be slightly greater than the diameters of the bosses 130, such that the bosses 130 may move along the perpendicular direction orthogonal to the elongated direction of the openings 136, although in a more constrained manner than along the elongated direction or the axial direction. In the illustrated embodiment, each of the openings 136 is elongated to allow the floating bosses 130 (and hence the portion of the torsion band assembly 110 to which the floating bosses 130 are attached) to move in a constrained manner along the axial directions of the floating bosses 130, but also along the elongated directions of the elongated openings 136. As will be described in further detail below, a cap or fastener having a size larger than a size of the openings 136 may be removably attached to the floating bosses 130 to retain the floating bosses 130 within the temple arm housings 132a, 132b, thereby preventing the floating bosses 130 from moving out of the temple arm housings 132a, 132b. As best shown in FIG. 8, corresponding openings 138 are also formed in the cosmetic covers 124a, 124b (only one opening 138 formed in the left cosmetic cover 124a shown).

It shall be note that two floating bosses 130 for each of the temple arms 108a, 108 is described, other configurations having more or fewer numbers of floating bosses 130 (e.g., one floating boss 130 for a temple arm 108) are also contemplated. In addition, the same number of floating bosses 130 need not be provided for both temple arms 128a, 128b, and the respective location(s) of floating boss (or bosses) 128 may not be symmetric with respect to the center line or plane of the eyewear device 100. Rather, each floating boss 130 may be devised in a custom manner to optimize or improve the overall stability of the eyewear device 100 based at least in part upon, for example, the weight distribution of the eyewear device 100 due to accommodation of various components in the frame front 102 and/or the temple arms 108 in some embodiments. Moreover, the floating bosses 130 may be located anywhere in the respective inner temple arm housings 132a, 132b, the floating bosses 130 may be generally located near the end of temple arm or temple arms 128 away from the frame front 102 or near where the torsion band assembly 110 is attached to the temple arms 108 to allow a wider range of movement.

Figure 5:
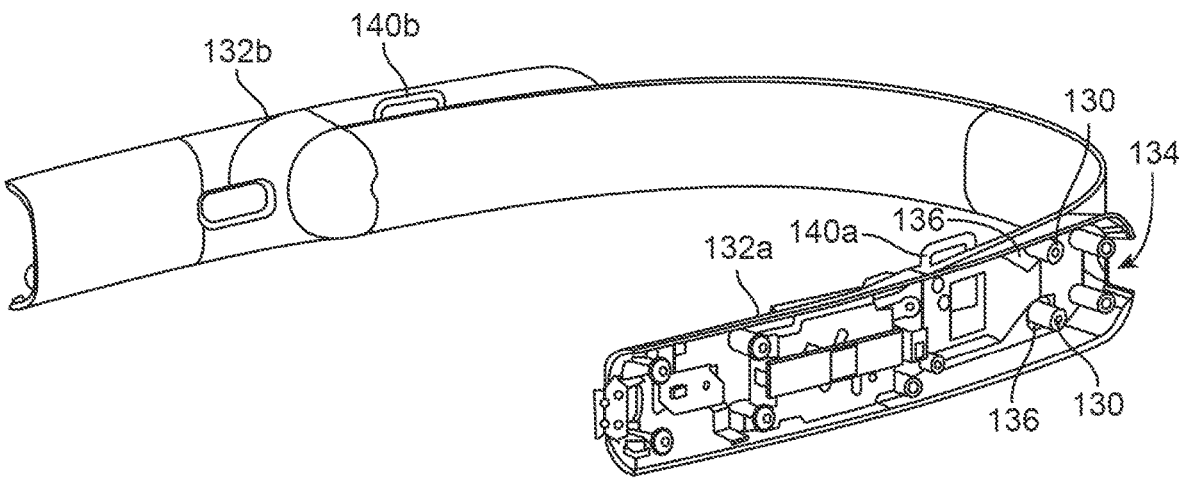
FIG. 5 is a top perspective view of the subassembly of FIG. 2, particularly showing a portion of a left temple arm housing removed from the left temple arm.
Figure 6:
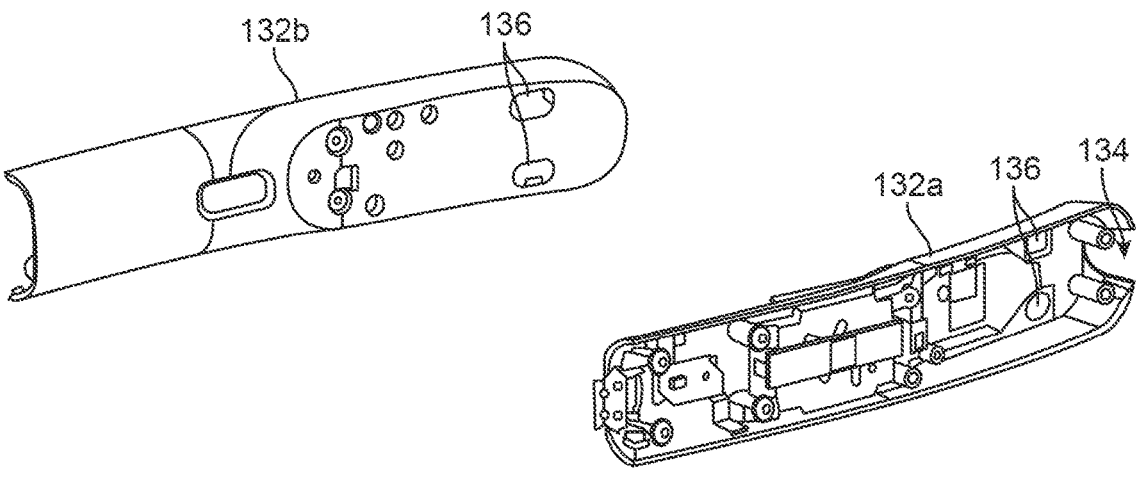
FIG. 6 is a top perspective view of the two opposing left and right temple arms of the subassembly of FIG. 2, particularly showing a portion of a left temple arm housing removed from the left temple arm.

As best shown in FIGS. 5 and 7, the torsion band assembly 110 comprises head strap eyelets 140 (a left head strap eyelet 140a and a right head strap eyelet 140b) affixed to opposing ends of a head strap or head band (not shown) that may rest on the top portion of a user's head to provide more support along the direction of gravity. Notably, the head strap eyelets 140a, 140b are removably or fixedly integrated into the torsion band housings 118a, 118b, cushion pads 122a, 122b, or cosmetic covers 124a, 124b, as opposed to the temple arm housings 132a, 132b. In this manner, loading carried by the head strap (not shown) through the head strap eyelets 140a, 140b is first partially transferred and absorbed by the torsion band assembly 110, so less loading is transmitted to the temple arms 108a, 108b or the remainder of the eyewear device 100, thereby minimizing any negative effect to the stability of the eyewear device 100. The head strap eyelets 140a, 140b may be affixed at any location that is determined to provide proper support with the head strap or head band attached. In some embodiments, the head strap eyelets 140a, 140b may be located closer to points of attachment between the torsion band assembly 110 and opposing temple arms 108a, 108b (than the midpoint of the torsion band assembly 110).

As briefly discussed above, one or both of the temple arm housings 132a, 132b may accommodate electronics. It should be noted that although FIGS. 5-9 illustrate various components as being located in the left temple arm housing 132a, any of these components may or may not necessarily be located in or provided for the right temple arm housing 132b. Rather, components may be located in or provided for both the left and right temple arm housings 132a, 132b in some embodiments, only the left inner temple arm housing 132a in other embodiments, or only the right inner temple arm housing 132b in some other embodiments.

As an example, and with specific reference to FIG. 9, the electronic components contained within left temple arm housing 132a may include, without limitation, a speaker assembly 142 and a printed circuit board assembly (PCBA) 144. In some embodiments, the left temple arm housing 132a may contained one or more heat transfer mechanisms or devices 146 (e.g., a heat pipe, a heat sink, a cooling plate, or any other heat transfer mechanisms or devices, or a combination thereof) that passively and/or actively dissipate heat generated by the electronic components, thereby reducing the negative effects generated by the heat on the electronic components, to provide better wearing comfort to the users, etc. In one embodiment, a heat pipe may be configured to be in contact with at least a portion of an electronic component (e.g., a portion of a surface of the packaging of an electronic component) to dissipate heat via thermal conduction and phase transition through the contact between the heat pipe and the electronic component. For example, a heat pipe may include a liquid that is in contact with a thermally conductive surface and turns into a vapor after absorbing heat generated by a heat source. The vapor may then travel within the heat pipe via, for example, capillary action, centrifugal force, gravity, etc. to a cold interface and condenses back into a liquid form to exchange the heat. A heat pipe may in and of itself serve to dissipate generated by electronic components in some embodiments or may function in conjunction with another heat transfer device (e.g., a heat sink) that is in direct contact with heat-generating electronic components to dissipate heat. In the illustrated embodiment, the electronic components contained within the right temple arm housing 132b are internally, electrically connected, to the cable 104 via internal wiring or cabling 147.

In the illustrated embodiment, the electronic componentry contained in the left temple arm housing 132a have a design-for-manufacturing aspect, where electrical connections (e.g., for the speaker assembly 142 and PCBA 144) and/or some mechanical assembly (e.g., assembly of a cable, one or more electronical components, etc.) may be wired completed outside the left temple arm housing 132a before placing electrically connected electronic component(s) and/ or mechanically assembled sub-assembly (or assemblies) into the left temple arm housing 132a. The electrically connected electronic component(s) and/or mechanically assembled sub-assembly or sub-assemblies may be secured to the left temple arm housing 132a with one or more fasteners 148 for ease of assembly and protection of the delicate components and/or sub-assemblies from damage.

The left temple arm housing 132a may be attached to left torsion band housing 118a by using one or more fasteners 150, and in the illustrated embodiment, two fasteners 150. The fasteners 150 may be devised to resist or prevent relative movement between the left temple arm 108a and the torsion band assembly 100 at the point or points of attachment. In the illustrated embodiment, the attachment points are further along the torsion band assembly 110 from the frame front 102 than the floating bosses 130, thereby securely affixing the midpoints of the left and right temple arms 108a, 108b to the torsion band assembly 110, while allowing the ends 126 of the temple arms 108a, 108b to separate from the torsion band assembly 110 via the floating bosses 130 when the torsion band assembly 110 is in the open configuration (see FIG. 3). It shall be noted that although FIG. 9 illustrates two fasteners 150, fewer fasteners 150 (e.g., one fastener for a temple arm 108) or more (e.g., more than two fasteners 150 for a temple arm 108) may be employed in other embodiments. Moreover, the torsion band assembly 110 may or may not be attached to the left and right temple arms 108a, 108b in exactly the same manner.

Referring now to FIGS. 10-14, further details regarding the torsion band assembly 110 and the temple arms 108 will be described. Although the description provided below relates to the left side of the torsion band assembly 110 and left temple arm 108a, it should be appreciated that such description can be applied to the right side of the torsion band assembly 110 and right temple arm 108b.

Figure 10:
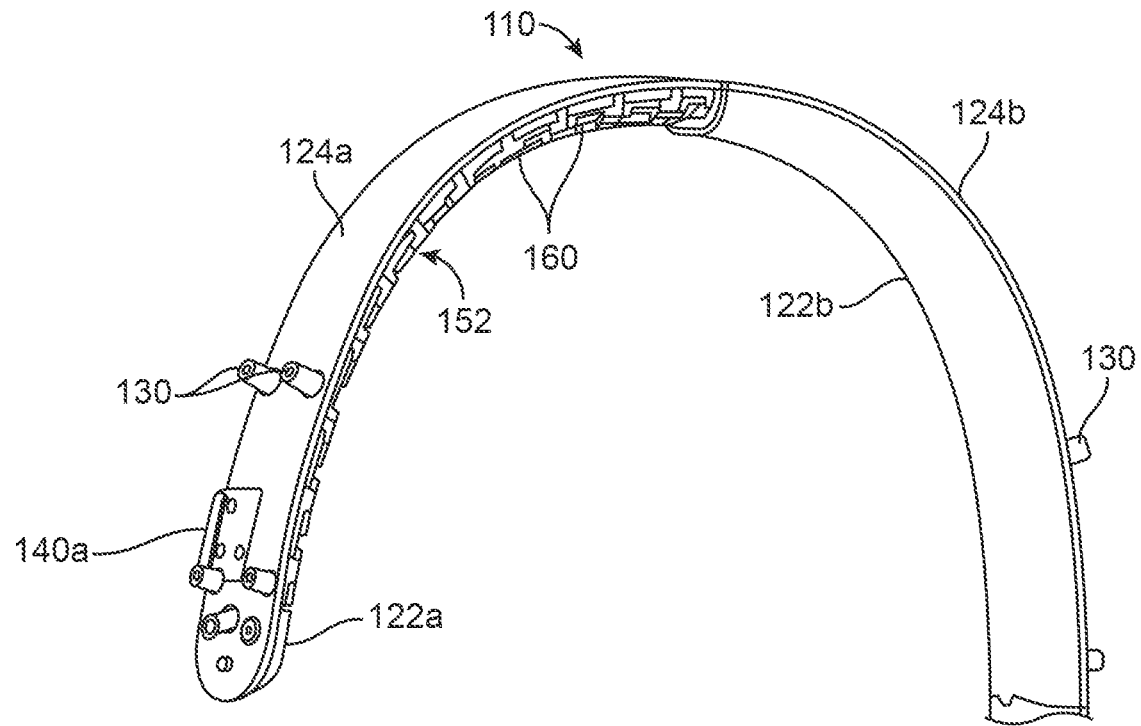
FIG. 10 is bottom perspective view of the torsion band assembly of the subassembly of FIG. 2, particularly showing a left cushion pad and a portion of a left torsion band housing removed from the torsion band assembly.
Figure 11:
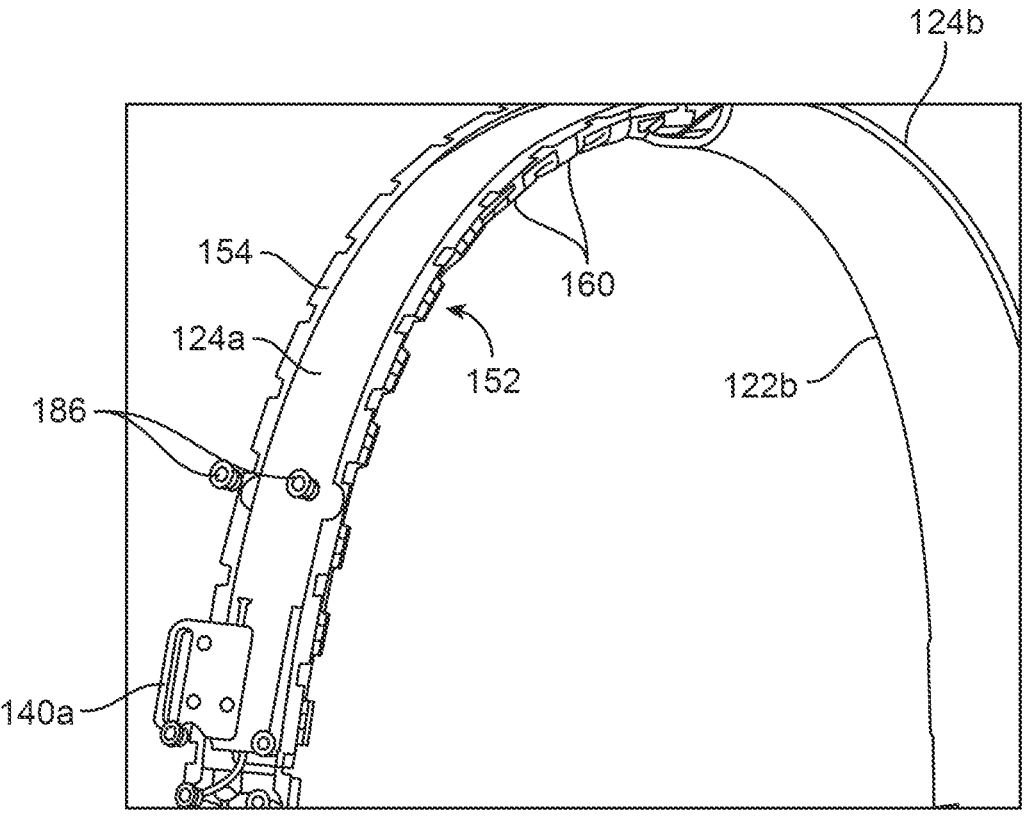
FIG. 11 is a close-up bottom perspective view of the torsion band assembly of the subassembly of FIG. 2, particularly showing a left cushion pad removed from the torsion band housing.

The left head strap eyelet 140a may be fixedly attached to the left cosmetic cover 124a of the torsion band assembly 110 on the opposing side of the left cushion pad 122a at any location that is determined to provide proper support with the head strap or head band attached (shown best in FIGS. 10-11).

The left torsion band housing 118a comprises an outer housing portion 152 and an inner housing portion 154 affixed to the outer housing portion 154. In the illustrated embodiment, the outer housing portion 152 and inner housing portion 154 have a nested arrangement (best shown in FIGS. 13-14). In particular, as illustrated in FIG. 14, the outer housing portion 152 has opposing slots 156 in which opposing flanges 158 of the inner housing portion 154 are nested.

Figures 12, 12A:
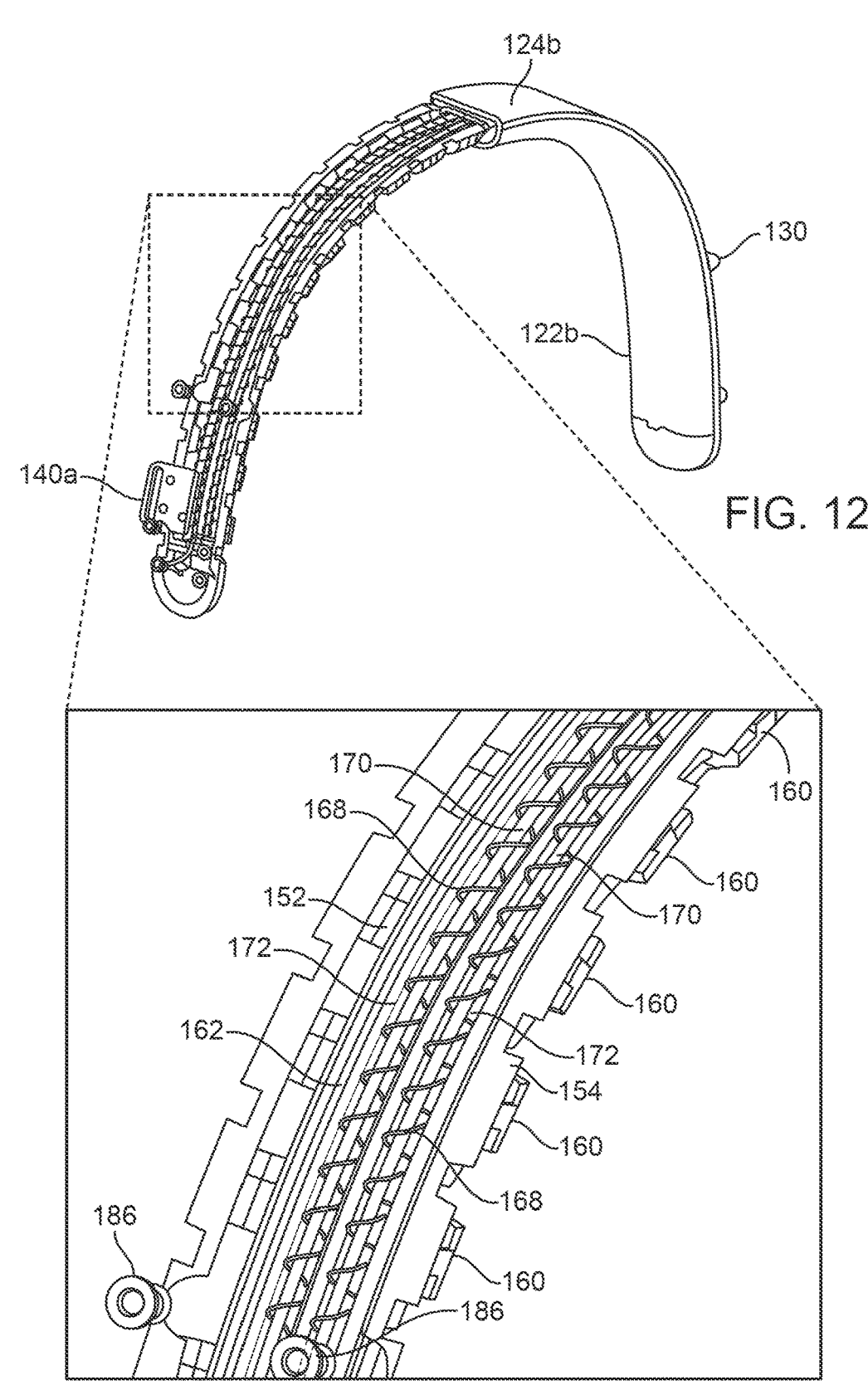
FIG. 12 is bottom perspective view of the torsion band assembly of the subassembly of FIG. 2, particularly showing a left cosmetic cover removed from the torsion band assembly.
FIG. 12A is a close-up view of a portion of the torsion band assembly of FIG. 12.

As best illustrated in FIGS. 10-12, the inner housing portion 154 takes the form of a cage, and the outer housing portion 152 comprises a plurality of cage snaps 160 that comprise individual cage snap pieces or components with uniform or non-uniform spacing in between. One or more spacings between the cage snaps 160 change when the torsion band assembly 110 deforms due to the operations of the torsion band assembly 110 (e.g., being extended or contracted), so as to retain internal components of the torsion band assembly 110 and/or to allow the torsion band guide 120 to articulate in response to expanding or contracting the torsion band assembly.

Figure 13:
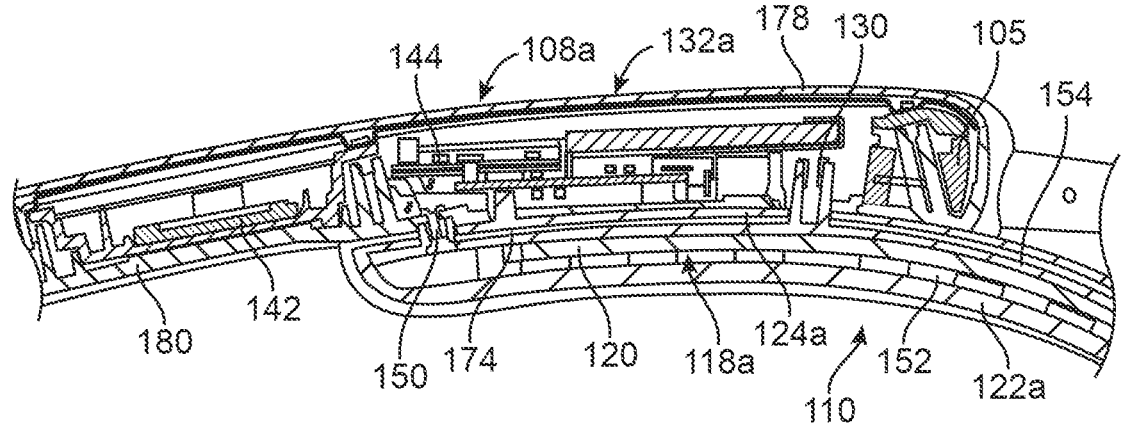
FIG. 13 is a cross-sectional view of the left temple arm and left side of the torsion band assembly of the subassembly of FIG. 2.
Figure 14:
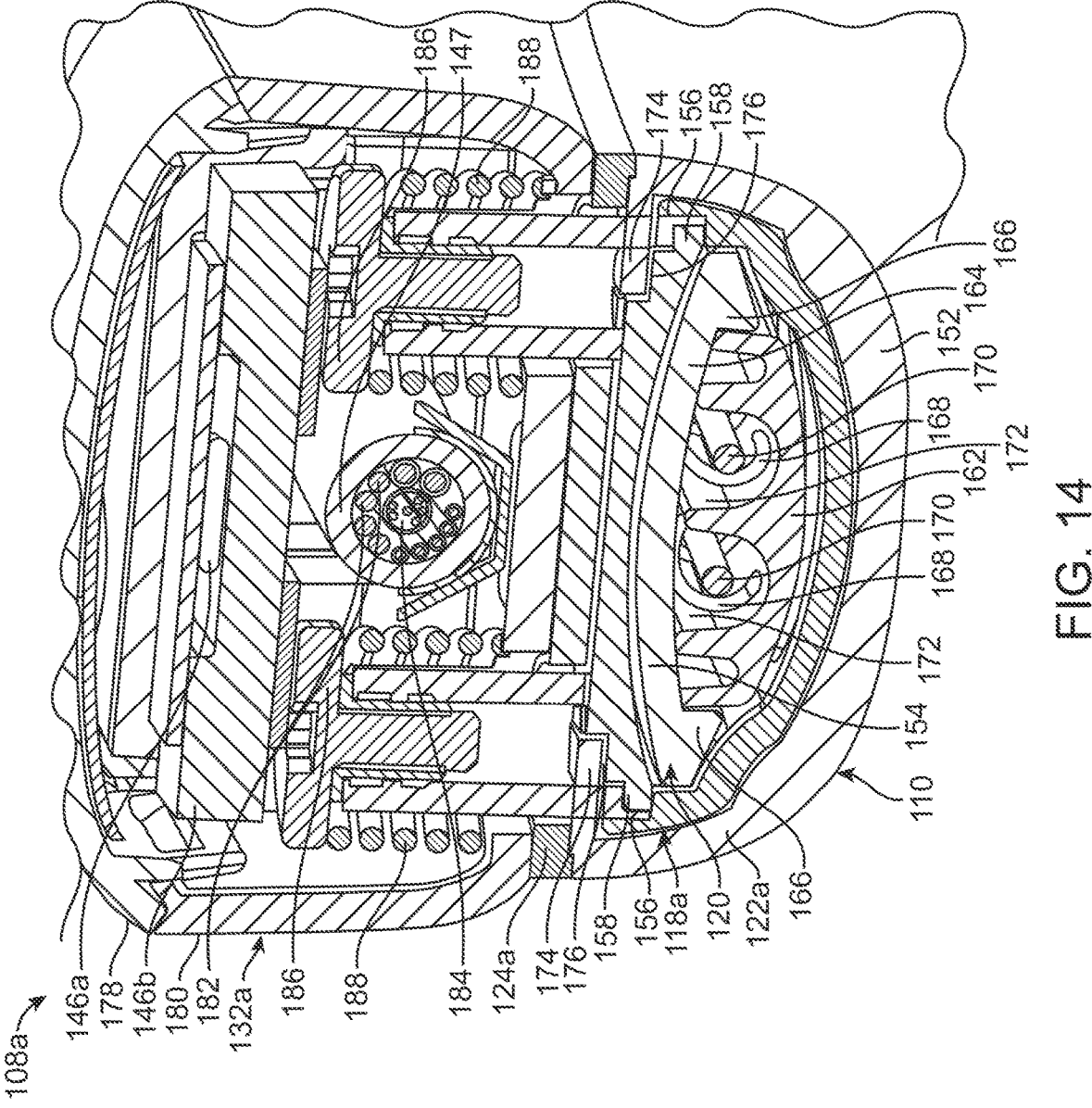
FIG. 14 is another cross-sectional view of the left temple arm and left side of the torsion band assembly of the subassembly of FIG. 2.

As shown in FIGS. 13-14, the torsion band guide 120, which is slidably disposed within the left torsion band housing 118a, comprises an outer strap 162 and an inner strap 164 affixed to the outer strap 162. In the illustrated embodiment, the outer strap 162 and inner strap 164 have a nested arrangement. In particular, the inner strap 164 has opposing tabs 166 (shown best in FIG. 14) between which the outer strap 162 are nested. The outer strap 162 and inner strap 164 of the torsion band guide 120 may be integrated together and retained by the cage snaps 160 of the outer housing portion 152 of the left torsion band housing 118a.

As best shown in FIGS. 12A and 14, the torsion band assembly 110 comprises one or more springs 168 (in the illustrated embodiment, a pair of springs 168) to assist in expanding the torsion band assembly 110 by compressing the springs 168 and/or contracting the torsion band assembly by decompressing the springs 168. A spring may be a device or component that exhibits a tensile or compressive force when its length changes from its equilibrium length, shape, or configuration. A spring may be of any form, types, and/or materials that accommodate expanding and contracting a torsion band assembly described herein. For example, a spring referred to herein may have a type or shape of a coil spring, a helical spring, a compression coil spring, a gas spring, a rubber band, a progressive rate coil spring, a tension or extension spring, a compression spring, a variable spring, or a variable stiffness spring, etc. A spring referred to herein may also be made of any elastic materials or super-elastic materials so that the spring exhibits a spring constant (or force constant) to allow users to extend and/or compress the spring manually with little efforts. For example, a spring may be made of spring steel, pre-hardened spring steel, annealed steel, any other suitable steel, non-ferrous metals such as phosphor bronze, titanium, beryllium copper, etc., natural rubber, synthetic rubber, or other polymers, etc.

The springs 168 may be devised to be in their neutral length (e.g., no compression or extension) in some embodiments. In other embodiments, the springs 168 may be devised in their slightly compressed states when the total length of the torsion band assembly 110 is in a closed configuration, and opening or expanding (increasing the total length of) the torsion band assembly 110 from the closed configuration further compresses the springs 168 to be under a higher compressive stress. The compressive stress in the springs 168 has the tendency to return the springs 168 to a state with less compressive stress, and thus, assists in securing the torsion band assembly 110 to a user's head. In some other embodiments, the springs 168 may be devised in their slightly extended states when the torsion band assembly 110 is in a closed configuration, and opening or expanding (increasing the total length of) the torsion band assembly 110 from the closed configuration further extends the springs 168 to be under a higher tensile stress. The tensile stress in the springs 168 has the tendency to return the springs 168 to a state with less tensile stress, and thus, assists in securing the torsion band assembly 110 to a user's head.

It should be noted that although FIGS. 13-14 illustrate two springs 168 on the left side of the torsion band assembly 110, more or fewer number of springs may be used. Moreover, the left side and the right side of a torsion band assembly 110 may or may not necessarily have the same configuration of springs. For example, one side of the torsion band assembly 110 may have more springs than the other side of the torsion band assembly 110. In some embodiments, one side of the torsion band assembly 110 may have no springs.

The torsion band assembly 110 optionally comprises one or more guide filaments 170 (in the illustrated embodiment, a pair of guide filaments 170) extending through the springs 168. The guide filaments 170 may run through the springs 168 for about the entire length of the springs 168 (although a longer or shorter guide filament may also be used) to prevent the springs 168 from kinking, to retain the positions of the springs 168, and/or to allow smooth operation (e.g., operation of opening or closing the torsion band assembly 110) by compressing and/or decompressing the springs 168. The springs 168 and guide filaments 170 extend within and along the length of the torsion band guide 120. In particular, the outer housing portion 164 of the torsion band guide 120 comprises one or more grooves 172 (in the illustrated embodiment, a pair of grooves 172) that extend along the length of the torsion band guide 120 for accommodating the springs 168 and guide filaments 170. In some embodiments, either the guide filaments 170 or the grooves 172 may not be needed in the torsion guide 120.

As best illustrated in FIG. 14, the left cushion pad 122*a* entirely wraps around the outer housing portion 152 and partially covers the inner housing portion 154 of the left torsion band housing 118*a*. In particular, the left cushion pad 122*a* includes opposing folded regions 174 that cover opposing stepped outer regions 176 of the inner housing portion 154 of the left torsion band housing 118*a*. The left cosmetic cover 124*a* is affixed over the folded regions 174 of the left cushion pad 122*a* and the region of the inner housing portion 154 between the stepped outer regions 176.

As best illustrated in FIGS. 13-14, the left temple arm housing 132*a* comprises an outer housing portion 178 and an inner housing portion 180 affixed to the outer housing portion 178 to enclose various components, including a portion of the electrical connector 105, speaker assembly 142, PCBA 144, and cabling 147, as well as heat transfer devices 146*a* (e.g., a heat pipe) and 146*b* (e.g., a heat sink or cooling plate). As best illustrated in FIG. 14, the cabling 147 encloses one or more electrical wires 182 and/or optical fiber cables 184. It should be noted that although FIG. 14 illustrates that the optical fiber cables 184 are surrounded by the electrical cables 182 in a round cabling 147, other arrangements such as one or more flat cables, or multiple bundles of cables, or a plurality of individual cables are also contemplated and may also be used.

The pair of floating bosses 130 separably or inseparably integrated with the left temple arm housing 132*a*. In the illustrated embodiment, the floating bosses 130 are formed as a unibody design with the inner housing portion 154. The floating bosses 130 extend from the inner housing portion 180 and through the corresponding openings 138 formed in the cosmetic cover 124*b* and the corresponding openings 136 formed in the inner housing portion 180 of the left temple arm housing 132*a*. As briefly discussed above, the earwear device 100 further comprises caps or fasteners 186 having a size larger than a size of the openings 136, 138, which are affixed to the floating bosses 130 to prevent the floating bosses 130 from moving out of the left temple arm housing 132*a*.

The floating bosses 130 may be optionally spring-loaded with, for example, spring 188 (shown in FIG. 14), so as to apply some calculated recovery force to the torsion band assembly 110 when the torsion band assembly 110 deforms, so that the torsion band assembly 110 does not move without constraints. Each spring 188 may be sized to provide the amount of compression force to maintain the eyewear device 100 at the proper position (e.g., the position that aligns the user's eyes with the lenses based on the pupil distance of the user, the position that aligns one or both eyes of the user with the optical center (or centers) of the corresponding lens (or lenses), etc.) or within an acceptable range of deviation from the proper position without causing discomfort for an extended use of the eyewear device for a predetermined extended period of time (e.g., eight consecutive hours). In some embodiments, the amount of compression force exerted on the torsion band assembly 110 may be determined to maintain the eyewear device 100 at the proper position or within an acceptable range of deviation from the proper position when the user wearing the eyewear device 100 remains stationary or exhibits a certain degree of motion (walking, running at or below a certain speed, dancing, performing various exercises, etc.) that may respectively exhibit certain patterns of motions and thus exert certain amount of forces in one or more directions that may cause the eyewear device 100 to move out of the acceptable range of deviation from the proper position.

Figure 15:
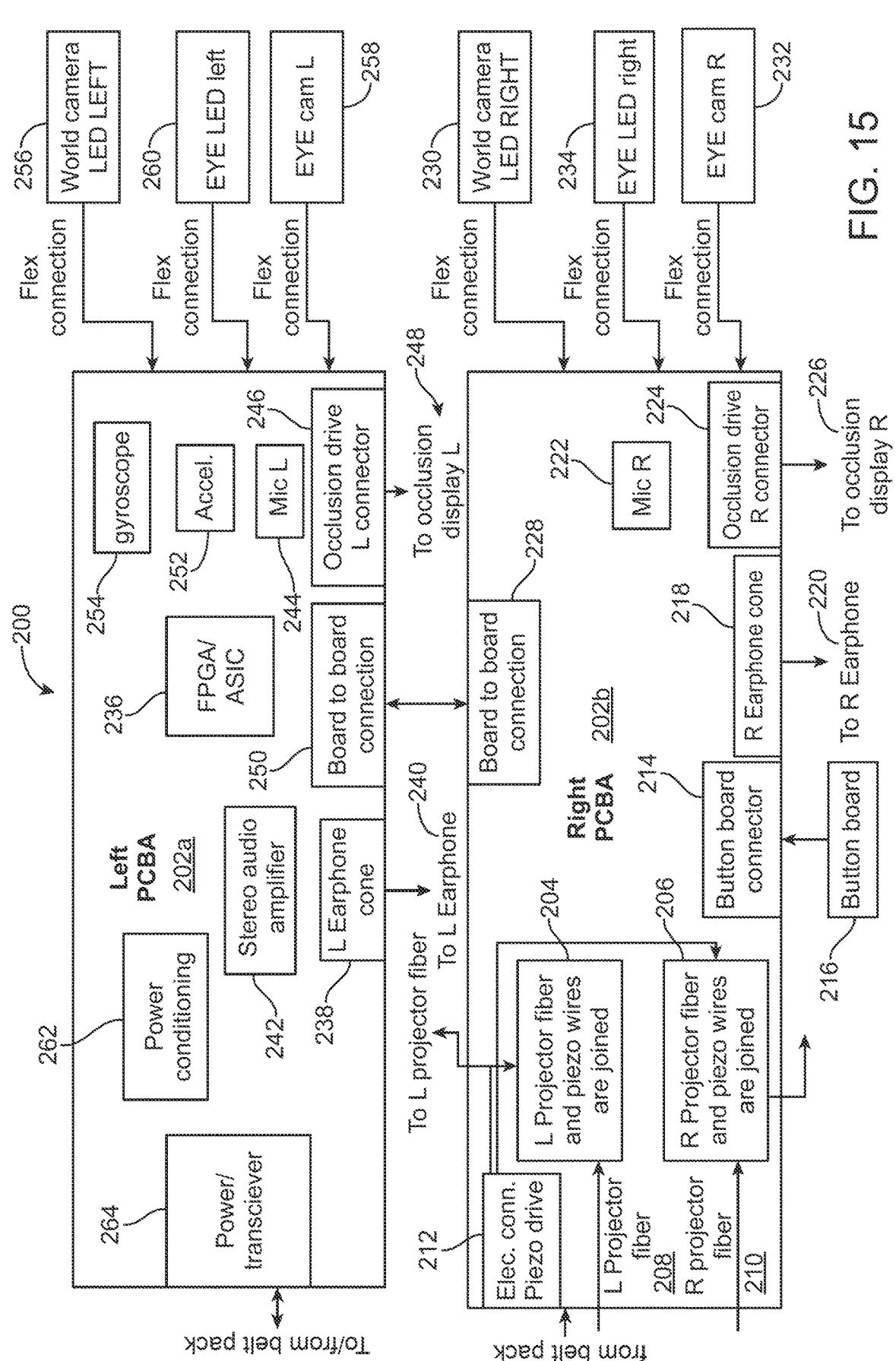
FIG. 15 is a block diagram of an exemplary architecture for the electronics contained with the left and rigid arms of the eyewear device of FIG. 1.

Referring now to FIG. 15, an example architecture 200 for the electronics contained within, or otherwise coupled to an optics system of the eyewear device 100 will not be described. The eyewear device 100, itself, or an external device (e.g., a belt pack worn by a user) coupled to the eyewear device 100, may include one or more printed circuit board components, for example, a left printed circuit board assembly (PCBA) 202*a* and a right printed circuit board assembly (PCBA) 202*b*. In one embodiment, some or all of the components illustrated in FIG. 15 may be housed within one or both of the inner temple arm housings 132*a*, 132*b* described above. As described, the left PCBA 202*a* includes most of the active electronics, while the right PCBA 202*b* principally supports the display or projector elements.

The right PCBA 202*b* may include a number of projector driver structures, which provide image information and control signals to image generation components. For example, the right PCBA 202*b* may carry a first or left projector driver structure 204 and a second or right projector driver structure 206. The first or left projector driver structure 204 joins a first or left projector fiber 208 and a set of signal lines (e.g., piezo driver wires) from a piezo drive structure 212. The second or right projector driver structure 206 joins a second or right projector fiber 210 and a set of signal lines (e.g., piezo driver wires) from the piezo drive structure 212. The first or left projector driver structure 204 is communicatively coupled to a first or left image projector, while the second or right projector drive structure 206 is communicatively coupled to the second or right image projector. Details discussing various embodiments of image projectors will be described in further below with respect to FIGS. 16-20.

The right PCBA 202*b* may further include a button board connector 214 may provide communicative and physical coupling to a button board 216, which carries various user accessible buttons, keys, switches or other input devices. The right PCBA 202*b* may include a right earphone or speaker connector 218, to communicatively couple audio signals to a right earphone 220 or speaker. The right PCBA 202*b* may also include a right microphone connector 222 to communicatively couple audio signals from a microphone of the head worn component. The right PCBA 202*b* may further include a right occlusion driver connector 224 to communicatively couple occlusion information to a right occlusion display 226 of the head worn component. The right PCBA 202*b* may also include a board-to-board connector 228 to provide communications with the left PCBA 202*a* via a corresponding board-to-board connector thereof.

The right PCBA 202*b* may be communicatively coupled to one or more right outward facing or world view cameras 230 which are body or head worn, and optionally a right cameras visual indicator (e.g., LED), which illuminates to indicate to others when images are being captured. The right PCBA 202*b* may be communicatively coupled to one or more right eye cameras 232, carried by the head worn component, positioned and orientated to capture images of the right eye to allow tracking, detection, or monitoring of orientation and/or movement of the right eye. The right PCBA 202*b* may optionally be communicatively coupled to one or more right eye illuminating sources 234 (e.g., LEDs), which as explained herein, illuminates the right eye with a pattern (e.g., temporal, spatial) of illumination to facilitate tracking, detection or monitoring of orientation and/or movement of the right eye.

The left PCBA 202a may include a control subsystem, which may include one or more controllers (e.g., microcontroller, microprocessor, digital signal processor, graphical processing unit, central processing unit, application specific integrated circuit (ASIC), field programmable gate array (FPGA), and/or programmable logic unit (PLU)) 236. The control system may include one or more non-transitory computer- or processor readable medium that stores executable logic or instructions and/or data or information. The non-transitory computer- or processor readable medium may take a variety of forms, for example volatile and nonvolatile forms, for instance read only memory (ROM), random access memory (RAM, DRAM, SD-RAM), flash memory, etc. The non-transitory computer or processor readable medium may be formed as one or more registers, for example of a microprocessor, FPGA or ASIC.

The left PCBA 202a may include a left earphone or speaker connector 238, to communicatively couple audio signals to a left earphone or speaker 240 of the head worn component. The left PCBA 202a may include an audio signal amplifier (e.g., stereo amplifier) 242, which is communicative coupled to the drive earphones or speakers. The left PCBA 202a may also include a left microphone connector 244 to communicatively couple audio signals from a microphone of the head worn component. The left PCBA 202a may further include a left occlusion driver connector 246 to communicatively couple occlusion information to a left occlusion display 248 of the head worn component. The right PCBA 202b may also include a board-to-board connector 250 to provide communications with the right PCBA 202b via the corresponding board-to-board connector 226 thereof.

The left PCBA 202a may also include one or more sensors or transducers which detect, measure, capture or otherwise sense information about an ambient environment and/or about the user. For example, an acceleration transducer 252 (e.g., three axis accelerometer) may detect acceleration in three axes, thereby detecting movement. A gyroscopic sensor 254 may detect orientation and/or magnetic or compass heading or orientation. Other sensors or transducers may be similarly employed.

The left PCBA 202a may be communicatively coupled to one or more left outward facing or world view cameras 256, which are body or head worn, and optionally a left cameras visual indicator (e.g., LED) 256, which illuminates to indicate to others when images are being captured. The left PCBA may be communicatively coupled to one or more left eye cameras 258, carried by the head worn component, positioned and orientated to capture images of the left eye to allow tracking, detection, or monitoring of orientation and/or movement of the left eye. The left PCBA 202a may optionally be communicatively coupled to one or more left eye illuminating sources (e.g., LEDs) 260, which as explained herein, illuminates the left eye with a pattern (e.g., temporal, spatial) of illumination to facilitate tracking, detection or monitoring of orientation and/or movement of the left eye.

The PCBAs 202a, 202b are communicatively coupled with the distinct computation component (e.g., belt pack) via one or more ports, connectors and/or paths. For example, the left PCBA 202a may include one or more communications ports or connectors to provide communications (e.g., bi-directional communications) with the belt pack. The one or more communications ports or connectors may also provide power from the belt pack to the left PCBA 202a. The left PCBA 202a may include power conditioning circuitry 262 (e.g., DC/DC power converter, input filter), electrically coupled to data and power connector or transceiver 264 (e.g., Thunderbolt® port, USB® port) and operable to condition (e.g., step up voltage, step down voltage, smooth current, reduce transients). The right PCBA 202b may include a port or connector to receive power from the belt pack. The image generation elements may receive power from a portable power source (e.g., chemical battery cells, primary or secondary battery cells, ultra-capacitor cells, fuel cells), which may, for example be located in the belt pack.

As illustrated, the left PCBA 202a includes most of the active electronics, while the right PCBA 202b supports principally supports the display or projectors, and the associated piezo drive signals. Electrical and/or fiber optic connections are employed across a front, rear or top of the body or head worn component of the eyewear device 100. Both PCBAs 202a, 202b are communicatively (e.g., electrically, optically) coupled to the belt pack. The left PCBA 202a includes the power subsystem and a high-speed communications subsystem. The right PCBA 202b handles the fiber display piezo drive signals. In the illustrated embodiment, only the right PCBA 202b needs to be optically connected to the belt pack. In other embodiments, both the left PCBA 202a and the right PCBA 202b may be connected to the belt pack.

While illustrated as employing two PCBAs 202a, 202b, the electronics of the body or head worn component may employ other architectures. For example, some implementations may use a fewer or greater number of PCBAs. As another example, various components or subsystems may be arranged differently than illustrated in FIG. 15. For example, in some alternative embodiments some of the components illustrated in FIG. 15 as residing on one PCBA may be located on the other PCBA, without loss of generality.

Referring to FIGS. 16-20, example configurations of optical systems for the eyewear device 100 will be described. In operation, image projectors of the optical systems render virtual content to the left and right eyes (e.g., retina) of the user via respective optical components, for instance waveguides and/or compensation lenses to alter the light associated with the virtual images. The image projectors may, for example, include left and right projector assemblies. The projector assemblies may use a variety of different image forming or production technologies, for example, fiber scan projectors, liquid crystal displays (LCD), LCOS displays, digital light processing (DLP) displays. Where a fiber scan projector is employed, images may be delivered along an optical fiber, to be projected therefrom via a tip of the optical fiber. The tip may be oriented to feed into the waveguide. The tip of the optical fiber may project images, which may be supported to flex or oscillate. A number of piezoelectric actuators may control an oscillation (e.g., frequency, amplitude) of the tip. The projector driver structures provide images to respective optical fiber and control signals to control the piezoelectric actuators, to project images to the user's eyes.

Figure 16:
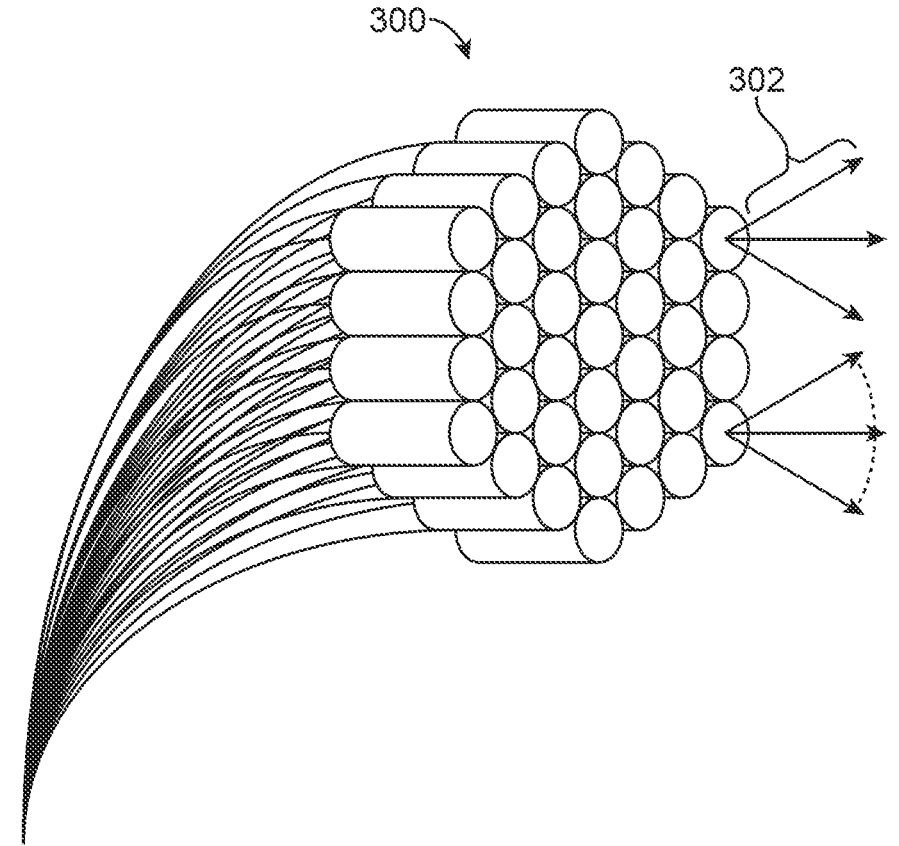
FIG. 16 is one example configuration of an array of micro-projectors of an optical system incorporated into the frame front of the eyewear device of FIG. 1.
Figure 17:
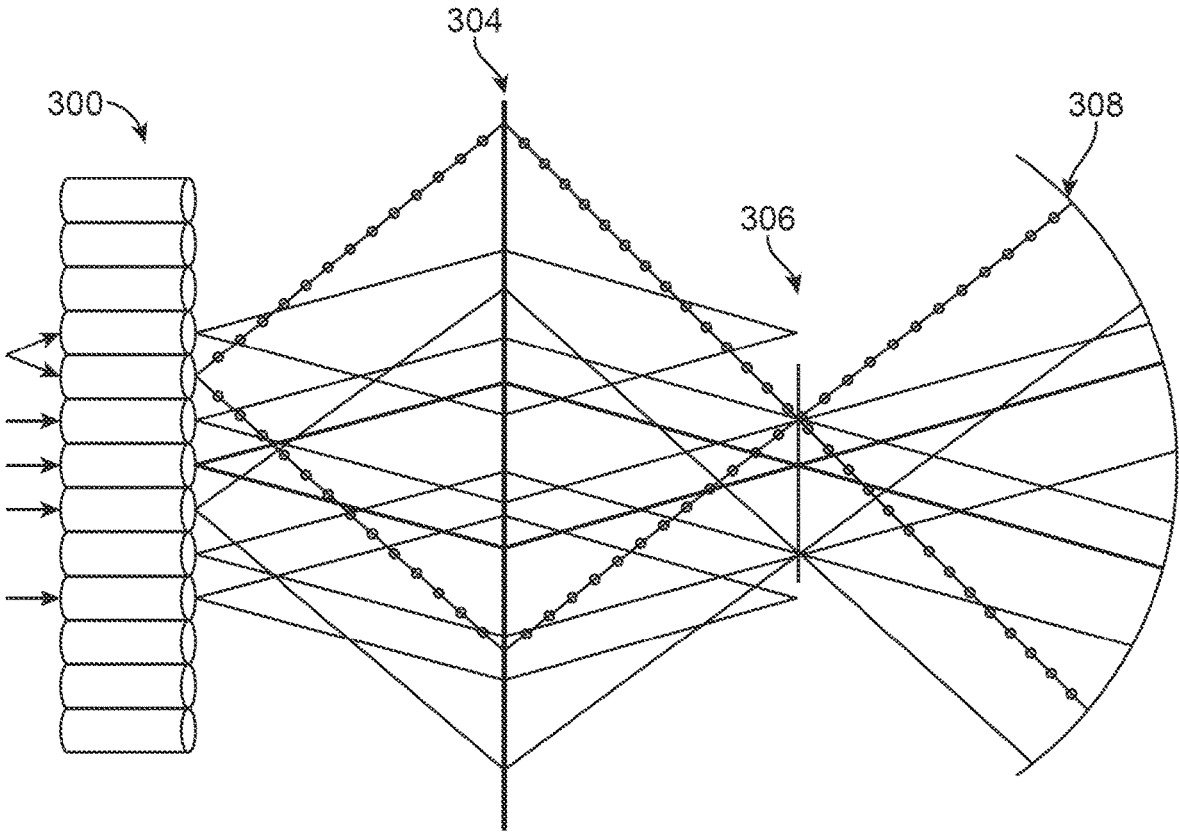
FIG. 17 is a diagram illustrating paths of light rays from the array of micro-projectors of FIG. 16 into an anatomical entrance pupil of an eye of the user of the eyewear device of FIG. 1.

Referring first to FIGS. 16-17, in one embodiment, a stereoscopic (e.g., three-dimensional) or a four- or five-dimensional lightfield may be created by bundling a group of small projectors or display units (such as scanned fiber displays) 300. For example, a hexagonal lattice projection bundle may, for example, create a 7 mm-diameter hex array with each fiber display outputting a sub-image 302. If an optical system, such as a lens 304, is placed in front of the hexagonal lattice projection bundle 300, such that the hexagonal lattice projection bundle 300 is placed optically conjugate with the user's pupil (i.e., the anatomical entrance pupil 306), this will create an image of the array at the anatomical entrance pupil 306 of the eye 308 of the user, as shown in FIG. 17.

Each of the small exit pupils of the configuration is created by a dedicated small display in the hexagonal lattice projection bundle 300, such as a scanning fiber display. Optically, it is as though the entire hexagonal lattice projection bundle 300 is positioned right into the anatomical entrance pupil 306 in some embodiments. Such embodiments may be used for driving different sub-images 302 to different small exit pupils within the larger anatomical entrance pupil 306, comprising a superset of beamlets with a multiplicity of incident angles and points of intersection with the anatomical entrance pupil 306. Each of the separate projectors or displays may be driven with a slightly different image, such that sub-images 302 may be created that pull out different sets of rays to be driven at different light intensities and colors.

In the strict image conjugate shown in FIG. 17, there is direct one-to-one mapping of the hexagonal lattice projection bundle 300 with the anatomical entrance pupil 306. The spacing may be changed between displays in the hexagonal lattice projection bundle 300 and the lens 304, such that instead of receiving a conjugate mapping of the hexagonal lattice projection bundle 300 to the anatomical entrance pupil 306, the anatomical entrance pupil 306 may be catching the rays from the hexagonal lattice projection bundle 300 at some other distance. With such a configuration, one would still get an angular diversity of beams through which one could create a discretized aggregate wavefront representation, but the mathematics regarding how to drive which ray and at which power and intensity may become more complex (although, on the other hand, such a configuration may be considered simpler from a viewing optics perspective). The mathematics involved with light field image capture may be leveraged for these calculations.

Figure 18:
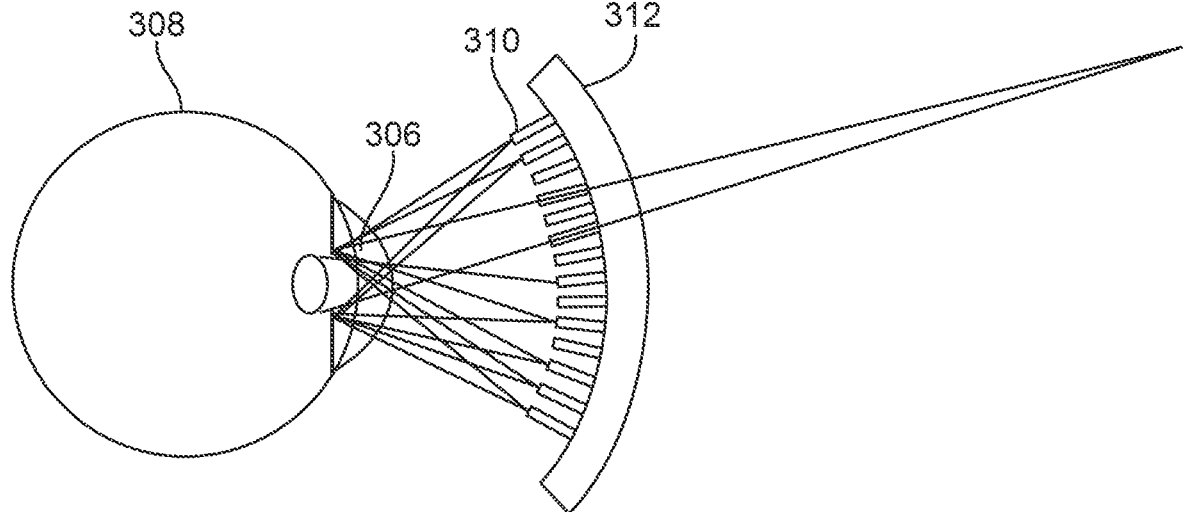
FIG. 18 is another example configuration of an array of micro-projectors of an optical system incorporated into the frame front of the eyewear device of FIG. 1.
Figure 19:
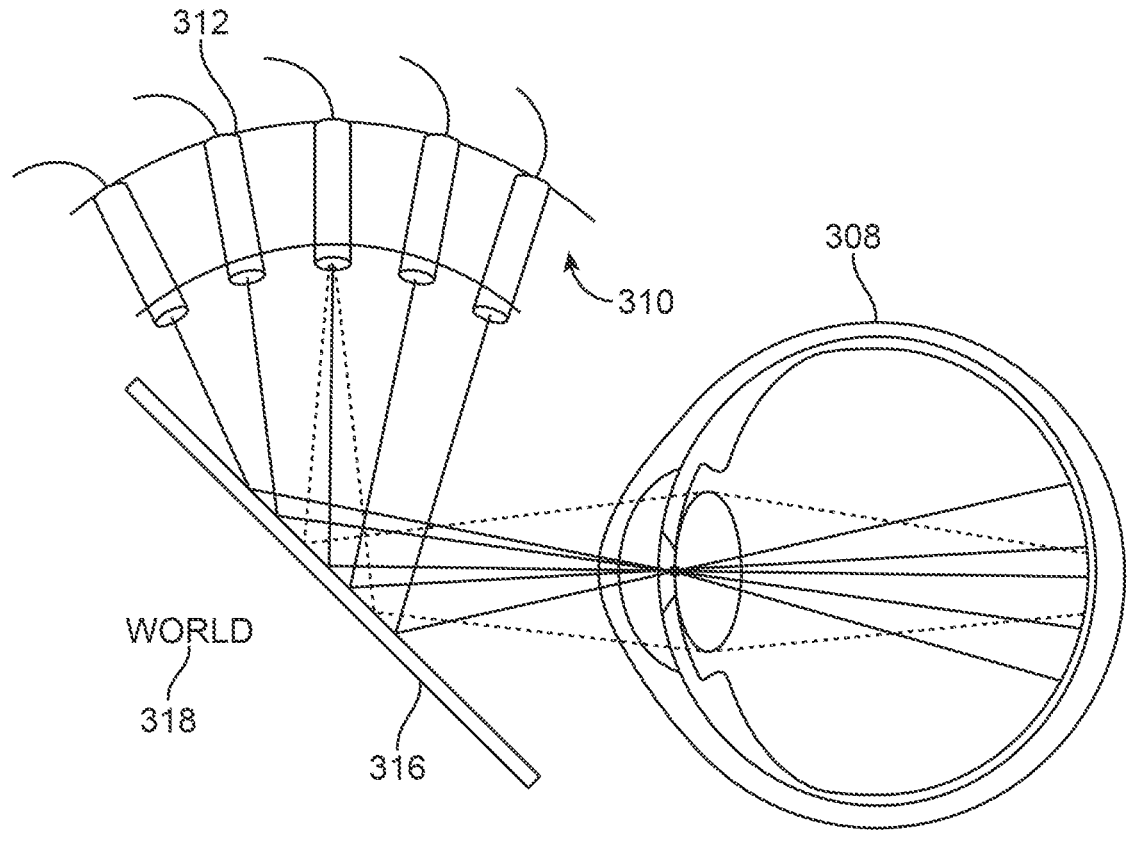
FIG. 19 is a diagram illustrating paths of light rays from the array of micro-projectors of FIG. 18 into an anatomical entrance pupil of an eye of the user of the eyewear device of FIG. 1.

Referring to FIGS. 18-19, another light field or stereoscopic view creating embodiment is depicted wherein an array of micro-displays or micro-projectors 310 may be coupled to a frame 312, such as the frame front 102 illustrated in FIG. 1. The array of micro-displays or micro-projectors 310 may be positioned orthogonal to the surface of the frame front 102, and all angled inward so they are pointing at the anatomical entrance pupil 306. Each display may be configured to create a set of rays representing different elements of the beamlet superset. This configuration may be positioned in front of the eye 308. The depicted configuration is a nonconjugate arrangement, wherein there are no large-scale optical elements interposed between the displays (for example, scanning fiber displays) of the array of micro-displays or micro-projectors 310 and the eye 308. Instead, this embodiment includes a reflecting surface 316 to facilitate moving the array of micro-displays or micro-projectors 310 away from the field of view of the eye 308, while also allowing views of the real world 318 through the reflective surface 316.

Another configuration for creating the angular diversity for a discretized aggregate wavefront display is described will be described. To optimize such a configuration, the sizes of the displays may be decreased to the maximum. Scanning fiber displays, which may be utilized as displays, may have baseline diameters in the range of 1 mm, but reduction in enclosure and projection lens hardware may decrease the diameters of such displays to about 0.5 mm or less, which is less disturbing for a user. Another downsizing geometric refinement may be achieved by directly coupling a collimating lens (which may, for example, comprise a gradient refractive index, or "GRIN", lens, a conventional curved lens, or a diffractive lens) to the tip of the scanning fiber itself in a case of a fiber scanning display array.

Figure 20:
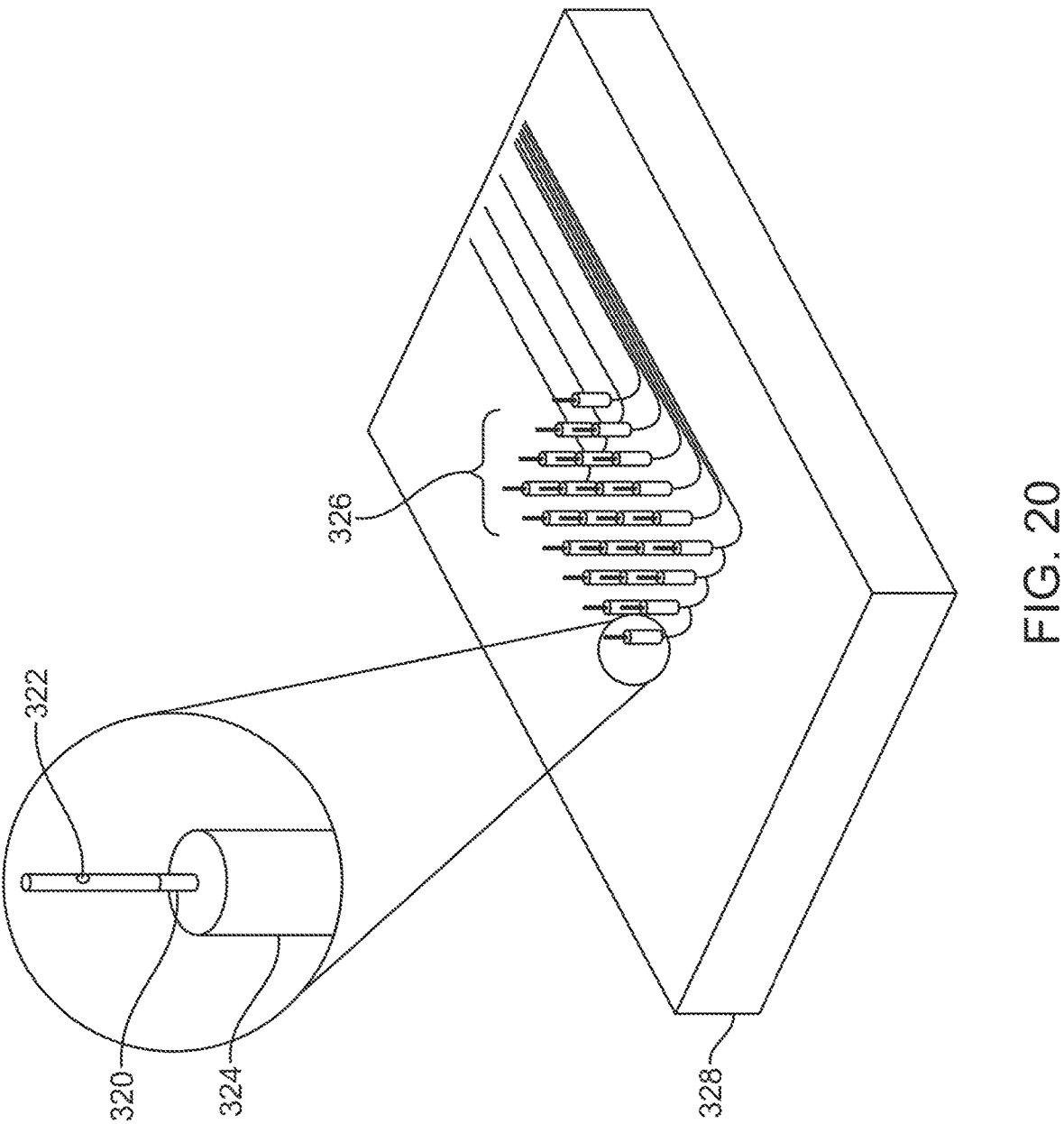
FIG. 20 is still another example configuration of an array of micro-projectors of an optical system incorporated into the frame front of the eyewear device of FIG. 1.

For example, with reference to FIG. 20, this configuration may include a single mode optical fiber 320 with a GRIN (gradient-index) lens 320 fused to the end thereof. An actuator 324, such as a piezoelectric actuator, may be coupled to the fiber 320 and may be used to scan the fiber tip. Alternatively, the end of the fiber 320 may be shaped into a hemispherical shape using a curved polishing treatment of an optical fiber to create a lensing effect. In another embodiment, a standard refractive lens may be coupled to the end of each optical fiber 320 using an adhesive. In still another embodiment a lens may be built from a dab of transmissive polymeric material or glass, such as epoxy. In yet another embodiment, the end of an optical fiber may be melted to create a curved surface for a lensing effect.

In one embodiment, the fibers 320 may be may be coupled together in a matrix 326 through a single transparent substrate 328, preferably having a refractive index that closely matches the cladding of the optical fibers 320, such that the fibers 320, themselves, are not substantially visible for viewing of the outside world across the depicted assembly. It should be appreciated that if the index matching of the cladding is done precisely, then the larger cladding/housing becomes transparent and only the small cores, which preferably are about three (3) microns in diameter, will be obstructing the view. In one embodiment, the fiber matrix 326 may all be angled inward so they are directed toward the anatomical entrance pupil (in another embodiment, they may stay parallel to each other, but such a configuration is less efficient).

Figure 21:
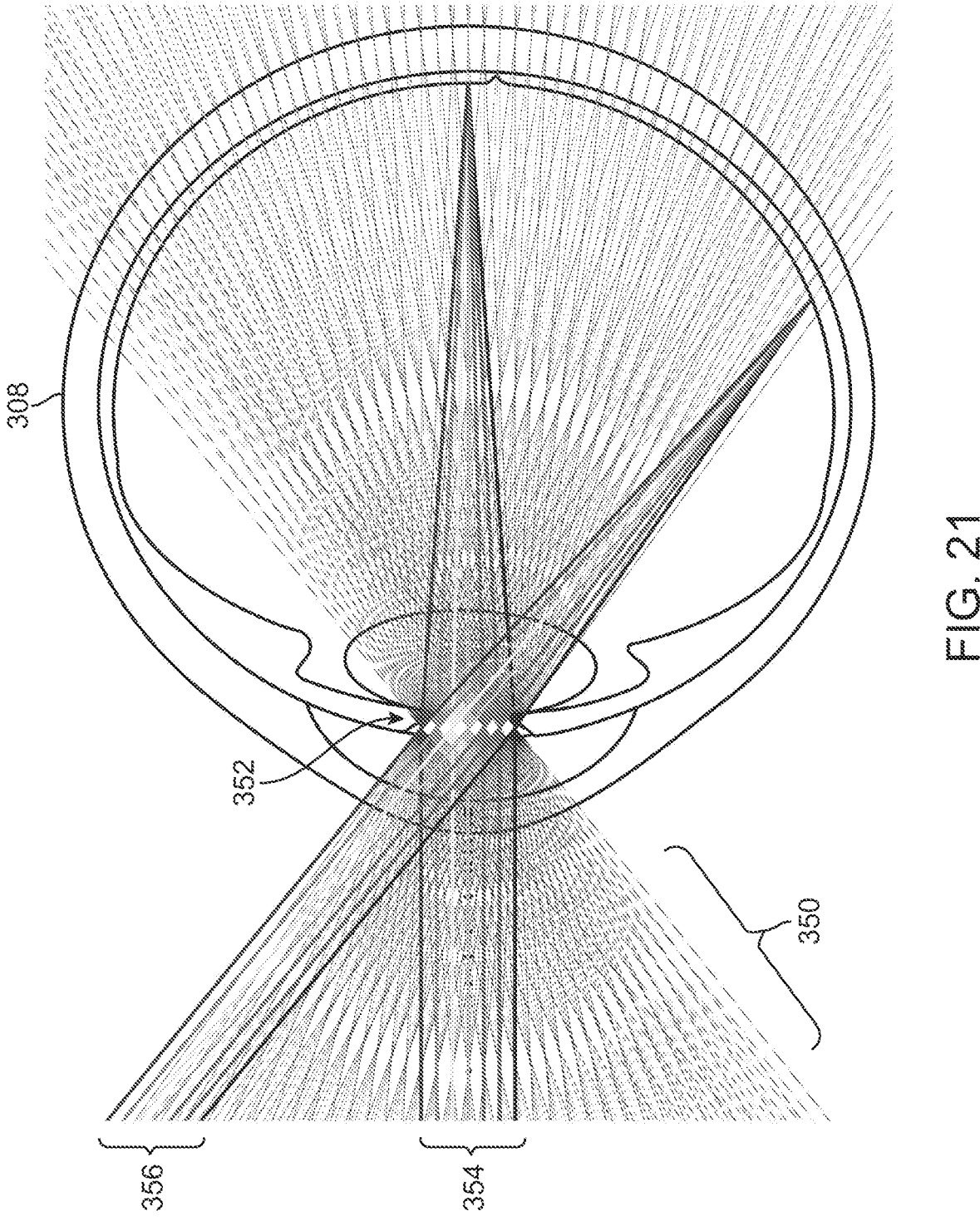
FIG. 21 is a diagram showing the anatomical entrance pupil of the user of the eyewear device receiving all light rays from the configurations of array of micro-projectors of FIGS. 16, 18, and 20.

As illustrated in FIG. 21, every point at the anatomical entrance pupil 306 is receiving rays with a multiplicity of angles of incidence and points of intersection that are being contributed from the different displays described above in the different configurations illustrated in FIGS. 15-20. Each of a multiplicity of incoming beamlets 350 is passing through a small exit pupil 352 relative to the eye 308 in a discretized wavefront display configuration. A subset 354 of the group of beamlets 350 may be driven with matching color and intensity levels to be perceived as though they are part of the same larger-sized ray. In this case, the subset of beamlets 354 is parallel to one another, representing a collimated aggregate beam from optical infinity (such as light coming from a distant mountain). Another subset of beamlets representing an aggregated collimated beam 356 coming in from the right side of the field of view of the user's eye 308 if the eye 308 is viewed in a coronal-style planar view from above. The eye 308 is accommodated to infinity, so the subset of beamlets 354 and the subset of beamlets 356 is deflected by the eye's cornea and lens to all fall substantially upon the same location of the retina and are perceived to comprise a single in focus pixel. If, in contrast, a different subset of beamlets were chosen that were reaching the eye 308 as a diverging fan of rays, those beamlets would not fall on the same location of the retina (and be perceived as in focus) until the eye 308 were to shift accommodation to a near point that matches the geometrical point of origin of that fan of rays.

With regards to patterns of points of intersection of beamlets with the anatomical entrance pupil of the eye 308 (e.g., the pattern of exit pupils), the points of intersection may be organized in configurations such as a cross-sectionally efficient hex-lattice or a square lattice or other two-dimensional array. Further, a three-dimensional array of exit pupils could be created, as well as time-varying arrays of exit pupils. Discretized aggregate wavefronts may be created using several configurations, such as an array of micro-displays or microprojectors placed optically conjugate with the exit pupil of viewing optics, microdisplay or micropro-jector arrays coupled to a direct field of view substrate (such as an eyeglasses lens) such that they project light to the eye directly, without additional intermediate viewing optics, successive spatial light modulation array techniques, or waveguide techniques.

In the description above, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual reality (VR), augmented reality (AR), mixed reality (MR), and extended reality (XR) systems have not been shown or described in detail to avoid unnecessarily obscuring descriptions of the embodiments. It shall be note that the terms virtual reality (VR), augmented reality (AR), mixed reality (MR), and extended reality (XR) may be used interchangeably in the present disclosure to denote a method or system for display-ing at least virtual contents to a user via at least the eyewear device 100 described above. In the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An eyewear device for being worn on a head of a user for presenting virtual content to a user, comprising:
   an optics system;
   a frame front operatively coupled to the optics system for presenting virtual content to a user wearing the eyewear device;
   left and right opposing temple arms affixed to the frame front;
   an adjustable band assembly that extends or contracts and comprises a first end and second end, wherein the first and the second ends respectively connect the left and right opposing temple arms; and
   a first boss that is located at at least the first end of the adjustable band assembly and is movably received within a corresponding opening in at least one of the left and right opposing temple arms, wherein the cor-responding opening is devised to permit movement of the at least first boss along more than one axis.

2. The eyewear device of claim 1, wherein the one or more axes comprises at least one axis of the at least first boss.

3. The eyewear device of claim 2, wherein the one or more axes comprises an axis orthogonal to the at least one axis of the at least first boss.

4. The eyewear device of claim 2, further comprising at least at least a cap or fastener respectively affixed to the at least first boss within the one of the left and right opposing temple arms, thereby retaining at least a portion of the at least first boss within the one of the left and right opposing temple arms.

5. The eyewear device of claim 1, further comprising at least a second boss that protrudes partially into the other of the left and right opposing temple arms.

6. The eyewear device of claim 5, wherein the left temple arm comprises a left temple arm housing into which the at least first boss protrudes, and the right temple arm comprises a right temple arm housing into which the at least second boss protrudes.

7. The eyewear device of claim 6, wherein the left temple arm housing has at least one opening through which the at least first boss extends, and the right temple arm housing has at least one opening through which the at least second boss extends.

8. The eyewear device of claim 7, wherein each of the at least one opening of the left temple arm housing and the right temple arm housing is elongated.

9. The eyewear device of claim 6, further comprising electronics contained within at least one of the left temple arm housing and the right temple arm housing for control-ling the optics system.

10. The eyewear device of claim 1, wherein the adjustable band assembly comprises an adjustable band guide, and a left adjustable band housing and a right adjustable band housing that jointly enclose, and slide along, the adjustable band guide to extend or contract a total length of the adjustable band assembly.

11. The eyewear device of claim 10, wherein the adjust-able band assembly further comprises at least one spring located within the adjustable band guide, wherein the at least one spring is configured for being compressed or expanded when the total length of the adjustable band assembly increases, thereby assisting in securing the adjustable band assembly to the head of the user.

12. The eyewear device of claim 10, wherein the at least first boss is fixedly attached to one of the left adjustable band housing and the right adjustable band housing.

13. The eyewear device of claim 10, wherein each of the left adjustable band housing and a right adjustable band housing comprises a plurality of cage snaps arranged within the adjustable band assembly at one or move spacing values, such that the one or more spacing values change when the total length of the adjustable band assembly changes or the adjustable band assembly deforms.

14. The eyewear device of claim 10, further comprising a head strap having opposing ends, wherein the adjustable band assembly further comprises a left eyelet affixed between the left adjustable band housing and one of the opposing ends of the head strap, and a right eyelet affixed between the right adjustable band housing and the other end of the head strap, such that the head strap is configured for resting on a top of the head of the user to provide support along a direction of gravity.

15. The eyewear device of claim 10, wherein the at least first boss is configured for allowing an increase in a gap between the one of the left and right opposing temple arms and the adjustable band assembly when the total length of the adjustable band assembly is extended, and for allowing a decrease in the gap between the one of the left and right opposing temple arms and the adjustable band assembly when the total length of the adjustable band assembly is contracted.

16. The eyewear device of claim 1, wherein the adjustable band assembly further comprises at least one cushion pad located on an inner side of the adjustable band assembly that faces the head of the user when wearing the eyewear device.

17. The eyewear device of claim 16, wherein the adjust-able band assembly further comprises at least one cosmetic cover located on an outer side of the adjustable band assembly that faces away from the head of the user when wearing the eyewear device.

18. The eyewear device of claim 1, further comprising a fastener affixing the one of the left and right opposing temple arms to the adjustable band assembly at an attachment point, thereby preventing the one of the left and right opposing arms from moving relative to the adjustable band assembly at the attachment point.

19. The eyewear device of claim 18, wherein the attachment point is further along the adjustable band assembly from the frame front than the at least first boss.

20. The eyewear device of claim 1, wherein the corresponding opening in the temple arm includes an elongated opening, and the first boss is movable within the elongated opening along a first axis defined by a length of the elongated opening.

\*    \*    \*    \*    \*